(12) United States Patent
Gangadharan et al.

(10) Patent No.: US 12,530,752 B2
(45) Date of Patent: Jan. 20, 2026

(54) VIEW SYNTHESIS FROM IMAGES AND/OR VIDEO USING MODEL-BASED INPAINTING

(71) Applicant: QUALCOMM Incorporated, San Diego, CA (US)

(72) Inventors: Athul Gangadharan, Payyannur (IN); Vinay Melkote Krishnaprasad, Bangalore (IN); Sudipto Banerjee, Kolkata (IN); Jerin Geo James, Changanacherry (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/669,208

(22) Filed: May 20, 2024

(65) Prior Publication Data

US 2025/0356468 A1 Nov. 20, 2025

(51) Int. Cl.
*G06T 5/77* (2024.01)
*G06T 3/4053* (2024.01)
*G06T 5/60* (2024.01)
*H04N 5/262* (2006.01)

(52) U.S. Cl.
CPC .............. *G06T 5/77* (2024.01); *G06T 3/4053* (2013.01); *G06T 5/60* (2024.01); *H04N 5/2628* (2013.01); *G06T 2207/20084* (2013.01); *G06T 2207/30244* (2013.01)

(58) Field of Classification Search
None
See application file for complete search history.

(56) References Cited

U.S. PATENT DOCUMENTS

| 2016/0335795 | A1* | 11/2016 | Flynn | G06V 10/764 |
| 2020/0286293 | A1* | 9/2020 | Jia | G06T 15/205 |
| 2022/0301252 | A1* | 9/2022 | Wang | G06N 3/048 |
| 2024/0221308 | A1* | 7/2024 | Kopp | G16H 30/40 |

OTHER PUBLICATIONS

Nguyen P. Karnewar A, Huynh L, Rahtu E, Matas J, Heikkila J. Rgbd-net: Predicting color and depth images for novel views synthesis. In2021 International Conference on 3D Vision (3DV) Dec. 1, 2021 (pp. 1095-1105). IEEE. (Year: 2021).*

* cited by examiner

*Primary Examiner* — Clifford Hilaire
(74) *Attorney, Agent, or Firm* — Polsinelli LLP/QUALCOMM Incorporated

(57) ABSTRACT

Systems and techniques for image processing are described. For example, a computing device can receive a pose of a camera with a field-of-view (FOV) of a scene and can determine poses of the camera and/or pose(s) of other camera(s). The computing device can obtain first camera layers associated with the camera. The computing device can obtain, based on the pose of the camera and pixels within the first camera layers, a mask corresponding to the pose of the camera. The computing device can generate composited layers and can determine pixels for regions of the image using a first model based on the mask, the plurality of composited layers, the pose of the camera, and a plurality of images of the scene. The computing device can generate a final image of the scene corresponding to the pose of the camera based on providing the determined pixels to the regions.

20 Claims, 13 Drawing Sheets

VIEW SYNTHESIS FROM IMAGES AND/OR VIDEO USING MODEL-BASED INPAINTING

FIELD

The present disclosure generally relates to image processing. For example, aspects of the present disclosure relate to novel view synthesis from images and/or video (e.g., red, green, blue, and depth (RGBD) images, such as RGBD video) using model-based inpainting.

BACKGROUND

The increasing versatility of digital camera products has allowed digital cameras to be integrated into a wide array of devices and has expanded their use to different applications. For example, extended reality devices, phones, drones, cars, computers, televisions, and many other devices today are often equipped with camera devices. The camera devices allow users to capture images and/or video (e.g., including frames of images) from any system equipped with a camera device. The images and/or videos can be captured for recreational use, professional photography, surveillance, and automation, among other applications. Moreover, camera devices are increasingly equipped with specific functionalities for modifying images or creating artistic effects on the images. For example, many camera devices are equipped with image processing capabilities for generating different effects on captured images.

For image processing, rendering views of a scene in real time using a sparse set of available image frames can improve the way content can be consumed for virtual reality (VR) applications, which can result in an immersive VR experience for a user. For example, given a recorded stereo or mono color video of a static scene, it is desirable to be able to render the scene from any given viewpoint such that the end user is able to view the scene from the user's own perspective.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems and techniques for image processing. In some aspects, an apparatus for image processing is provided. The apparatus includes at least one memory and at least one processor coupled to the at least one memory and configured to: receive a pose of a camera with a field-of-view (FOV) of a scene; determine a plurality of poses of at least one of the camera or one or more other cameras, wherein the plurality of poses are in proximity with the pose of the camera; obtain a plurality of first camera layers associated with the camera, wherein each camera layer of the plurality of first camera layers includes a respective image of the scene captured by the camera and a respective pose of the plurality of poses when capturing the respective image; obtain, based on the pose of the camera and pixels within the plurality of first camera layers, a mask corresponding to the pose of the camera, the mask indicating missing pixels within regions of an image of the scene corresponding to the pose of the camera; generate a plurality of composited layers based on the pose of the camera and the plurality of first camera layers; determine pixels for the regions of the image using a first model based on the mask, the plurality of composited layers, the pose of the camera, and a plurality of images of the scene; and generate a final image of the scene corresponding to the pose of the camera based on providing the determined pixels to the regions of the image of the scene corresponding to the pose of the camera.

In some aspects, a method of image processing is provided. The method includes: receiving a pose of a camera with a field-of-view (FOV) of a scene; determining a plurality of poses of at least one of the camera or one or more other cameras, wherein the plurality of poses are in proximity with the pose of the camera; obtaining a plurality of first camera layers associated with the camera, wherein each camera layer of the plurality of first camera layers includes a respective image of the scene captured by the camera and a respective pose of the plurality of poses when capturing the respective image; obtaining, based on the pose of the camera and pixels within the plurality of first camera layers, a mask corresponding to the pose of the camera, the mask indicating missing pixels within regions of an image of the scene corresponding to the pose of the camera; generating a plurality of composited layers based on the pose of the camera and the plurality of first camera layers; determining pixels for the regions of the image using a first model based on the mask, the plurality of composited layers, the pose of the camera, and a plurality of images of the scene; and generating a final image of the scene corresponding to the pose of the camera based on providing the determined pixels to the regions of the image of the scene corresponding to the pose of the camera.

In some aspects, a non-transitory computer-readable medium is provided having stored thereon instructions that, when executed by at least one processor, cause the at least one processor to: receive a pose of a camera with a field-of-view (FOV) of a scene; determine a plurality of poses of at least one of the camera or one or more other cameras, wherein the plurality of poses are in proximity with the pose of the camera; obtain a plurality of first camera layers associated with the camera, wherein each camera layer of the plurality of first camera layers includes a respective image of the scene captured by the camera and a respective pose of the plurality of poses when capturing the respective image; obtain, based on the pose of the camera and pixels within the plurality of first camera layers, a mask corresponding to the pose of the camera, the mask indicating missing pixels within regions of an image of the scene corresponding to the pose of the camera; generate a plurality of composited layers based on the pose of the camera and the plurality of first camera layers; determine pixels for the regions of the image using a first model based on the mask, the plurality of composited layers, the pose of the camera, and a plurality of images of the scene; and generate a final image of the scene corresponding to the pose of the camera based on providing the determined pixels to the regions of the image of the scene corresponding to the pose of the camera.

In some aspects, an apparatus for image processing is provided. The apparatus includes: means for receiving a pose of a camera with a field-of-view (FOV) of a scene; means for determining a plurality of poses of at least one of the camera or one or more other cameras, wherein the plurality of poses are in proximity with the pose of the camera; means for obtaining a plurality of first camera layers associated with the camera, wherein each camera layer of the plurality of first camera layers includes a respective image of the scene captured by the camera and a respective pose of the plurality of poses when capturing the respective image; means for obtaining, based on the pose of the camera and pixels within the plurality of first camera layers, a mask corresponding to the pose of the camera, the mask indicating missing pixels within regions of an image of the scene corresponding to the pose of the camera; means for generating a plurality of composited layers based on the pose of the camera and the plurality of first camera layers; means for determining pixels for the regions of the image using a first model based on the mask, the plurality of composited layers, the pose of the camera, and a plurality of images of the scene; and means for generating a final image of the scene corresponding to the pose of the camera based on providing the determined pixels to the regions of the image of the scene corresponding to the pose of the camera.

Aspects generally include a method, apparatus, system, computer program product, non-transitory computer-readable medium, user equipment, base station, wireless communication device, and/or processing system as substantially described herein with reference to and as illustrated by the drawings and specification.

In some aspects, each of the apparatuses described above is, can be part of, or can include an audio device, a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
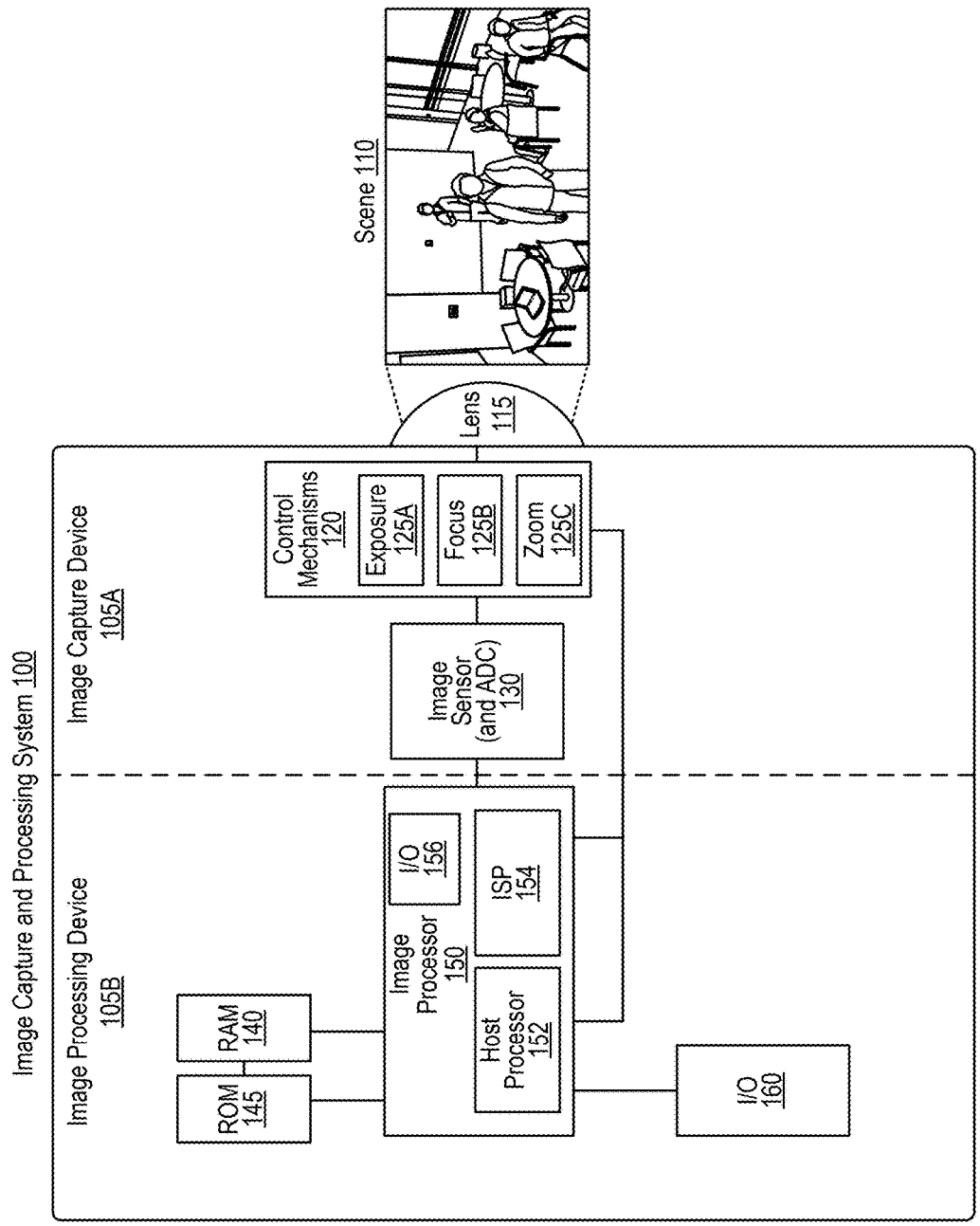
FIG. 1 is a block diagram illustrating an architecture of an image capture and processing system, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

A camera is a device that receives light and captures image frames, such as still images or video frames, using an image sensor. The terms "image," "image frame," and "frame" are used interchangeably herein. Cameras may include processors, such as image signal processors (ISPs), that can receive one or more image frames and process the one or more image frames. For example, a raw image frame captured by a camera sensor can be processed by an ISP to generate a final image. Processing by the ISP can be performed by a plurality of filters or processing blocks being applied to the captured image frame, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

Cameras can be configured with a variety of image capture and image processing operations and settings. The different settings result in images with different appearances. Some camera operations are determined and applied before or during capture of the image, such as automatic exposure control (AEC) and automatic white balance (AWB) processing. Additional camera operations applied before, during, or after capture of an image include operations involving zoom (e.g., zooming in or out), ISO, aperture size, f/stop, shutter speed, and gain. Other camera operations can configure post-processing of an image, such as alterations to contrast, brightness, saturation, sharpness, levels, curves, or colors.

As previously mentioned, for image processing, rendering views of a scene in real time using a sparse set of available image frames can improve the way content can be consumed for virtual reality (VR) applications, which can result in an immersive VR experience for a user. For example, given a recorded stereo or mono color video of a static scene, it is desirable to be able to render the scene from any given viewpoint such that the end user is able to view the scene from the user's own perspective.

For a shared experience, a scene may be captured in two-dimensions (e.g., in two-dimensional (2D) images) by a user's device (e.g., a mobile phone) to be visualized by another user in VR (e.g., via a head mounted device (HMD)). Several techniques can be performed for achieving a shared experience of a scene. One example of a technique involves simply playing the video just as it was captured. However, for this solution, the video will be decoupled from the user's head movement and, as such, when the user is viewing the video, the user may become nauseous if the camera motion is high. Another technique involves stitching together 2D images (e.g., red, green, blue (RGB) images) of the scene to create a stereoscopic 360 degree video or image of the scene. However, this solution only allows for three (3) degrees of freedom (DoF) and, as such, there is no six (6) DoF support. Another technique involves converting (e.g., by using structure from motion (SfM) or neural radiance field (NeRF) models) 2D RGBD images of a scene to generate an implicit three-dimensional (3D) scene representation. However, for this solution, the scene computation can be computationally intensive. This solution can also require a large memory footprint because of a higher storage requirement to store the 3D scene. In addition, for this solution, the synthesized images may not be of high quality.

As such, improved systems and techniques for a shared experience using images (e.g., RGBD images) that allow for high-quality consumption in VR (e.g., for real-time or near real-time applications), along with low computation and memory footprint requirements, can be beneficial.

In one or more aspects of the present disclosure, systems, apparatuses, methods (also referred to as processes), and computer-readable media (collectively referred to herein as "systems and techniques") are described herein for novel view synthesis (e.g., real-time or near real-time novel view synthesis) from images (e.g., RGBD images, such as RGBD video) using model-based inpainting. In one or more examples, the systems and techniques convert captured images (e.g., RGBD images) to an implicit representation of a 3D scene (with a low memory footprint and high quality real-time or near real-time consumption in VR) using a combination of a novel view synthesis model (e.g., a NeRF model or a Gaussian splatting model), depth-based reprojection, and an inpainting model (e.g., a generative artificial intelligence (AI) model). For the systems and techniques, the advantages of a novel view synthesis model, depth reprojection, and an inpainting model can be combined together into a single framework.

In one or more examples, depth-based reprojection for novel view synthesis can result in good quality images, except at object boundaries, which can be left as hole regions (e.g., regions missing pixels) within the image. Depth-based reprojection involves reprojecting an image from a rendered pose to a display pose (e.g., a pose of an XR device of a user, such as an HMD, augmented reality (AR) or mixed reality (MR) glasses, etc.) using a depth map corresponding to the image. When regions of the depth map have depth that is not continuous, after the depth-based reprojection, spatial artifacts, such as stretching or hole regions, can result, which can adversely affect the VR experience for the user.

The systems and techniques utilize a novel view synthesis model (e.g., a NeRF model or a Gaussian Splatting model) that can learn a 3D representation of the scene to obtain low resolution data for the hole regions. For example, the novel view synthesis model can learn the 3D structure of the scene by using low resolution 2D images (e.g., RGBD images) with different camera poses captured from the scene, and can render the scene given a display pose of a user's device (e.g., an HMD, AR or MR glasses, etc.). The novel view synthesis model can output per pixel color information (e.g., an RGB image) for the scene with low resolution. For the systems and techniques, an inpainting model (e.g., a generative AI model) can be trained to inpaint (e.g., fill in) the hole regions in a depth-based reprojected image of the scene taking guidance from the low resolution data from the novel view synthesis model.

In one or more examples, the systems and techniques provide a method for free viewpoint rendering of a scene given images and/or video (e.g., RGBD images and/or video) and camera poses of each frame captured using a mono or stereo camera. This method combines the capabilities of a novel view synthesis model (e.g., a NeRF model), depth based reprojection, and an inpainting model (e.g., a generative AI model) under one bundle to enable view synthesis (e.g., real-time or near real-time view synthesis) during consumption with a low memory footprint. In some examples, 3D scene data can be encoded as novel view synthesis model weights from a mono or stereo video. In one or more examples, hole regions within depth reprojected images can be inpainted (e.g., filled in with pixels) using an inpainting model, which uses low resolution images from a novel view synthesis model as a prior. In one or more examples, a method is provided that queries nearest neighbor camera poses based on a display pose of a user's device (e.g., an XR device, such as an HMD, AR or MR glasses, etc.), performs depth-based reprojection, and performs composition to minimize spatial artifacts, such as stretching and hole regions. In some examples, a method is provided that can encode image frames into a bitstream and store the bitstream on a disk or cloud server. During consumption, the model may decode only the image frames of the queried camera poses.

In one or more examples, during operation for novel view synthesis from images and/or video (e.g., RGBD images and/or video) using model-based inpainting, one or more processors of a device can receive a pose of a camera with a field-of-view (FOV) of a scene. The one or more processors can determine a plurality of poses of the camera and/or one or more other cameras, where the plurality of poses can be in proximity with the pose of the camera. The one or more processors can obtain a plurality of first camera layers associated with the camera, where each camera layer of the plurality of first camera layers can include a respective image of the scene captured by the camera and a respective pose of the plurality of poses when capturing the image.

The one or more processors can obtain, based on the pose of the camera and pixels within the plurality of first camera layers, a mask corresponding to the pose of the camera, the mask indicating missing pixels within regions of an image of the scene corresponding to the pose of the camera. The one or more processors can composite, based on the pose of the camera, the plurality of first camera layers to generate a plurality of composited layers. The one or more processors can determine pixels for the regions of the image using a first model based on the mask, the plurality of composited layers, the pose of the camera, and a plurality of images of the scene. The one or more processors can generate a final image of the scene corresponding to the pose of the camera based on providing the pixels to the regions of the image of the scene corresponding to the pose of the camera.

In one or more examples, the plurality of first camera layers can be generated by a depth-based reprojection of a plurality of initial camera layers. In some examples, each initial camera layer of the plurality of initial camera layers can include a respective image of the scene captured by the camera and a respective pose of the camera when capturing the image. In some cases, the plurality of images can be generated by a second model based on a plurality of second camera layers associated with the camera. In one or more examples, the plurality of first camera layers, the plurality of initial camera layers, and the final image can have a first resolution, where the plurality of images and the plurality of second camera layers can have a second resolution, and where first resolution can be a higher resolution than the second resolution.

In one or more examples, the second model can be a NeRF model or a Gaussian splatting model. In some examples, the second model can be trained on a device associated with the camera or a server. In one or more examples, a pose tracker (e.g., of the device) can obtain the pose of the camera.

In some cases, the first model can be a diffusion model, a vision-based transformer model, or a generative adversarial network (GAN). In one or more examples, the plurality of first camera layers can be encoded into a bitstream and stored on a server. In some examples, an FOV associated with each pose of the plurality of poses can intersect the FOV associated with the pose of the camera. In one or more examples, the camera can be associated with a device. In some examples, the device can be an XR device, such as an HMD, AR or MR glasses, or other type of XR device.

Additional aspects of the present disclosure are described in more detail below.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 11:
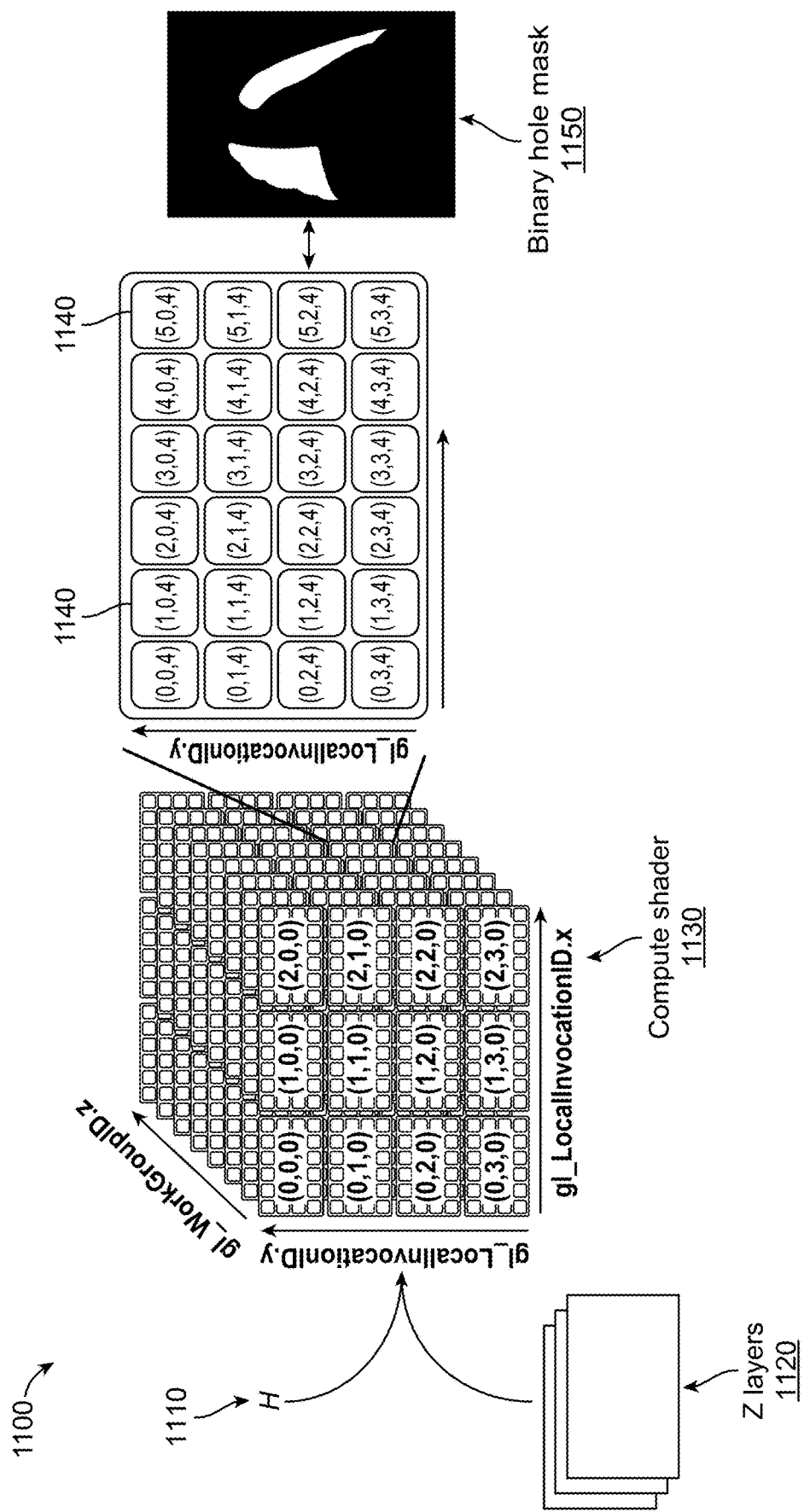
FIG. 11 is a diagram illustrating an example of a process for generating a mask, in accordance with some aspects of the present disclosure.

The image processor 150 may include one or more processors, such as one or more image signal processors (ISPs) (including ISP 154), one or more host processors (including host processor 152), and/or one or more of any other type of processor 1110 discussed with respect to the computing system 1100 of FIG. 11. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
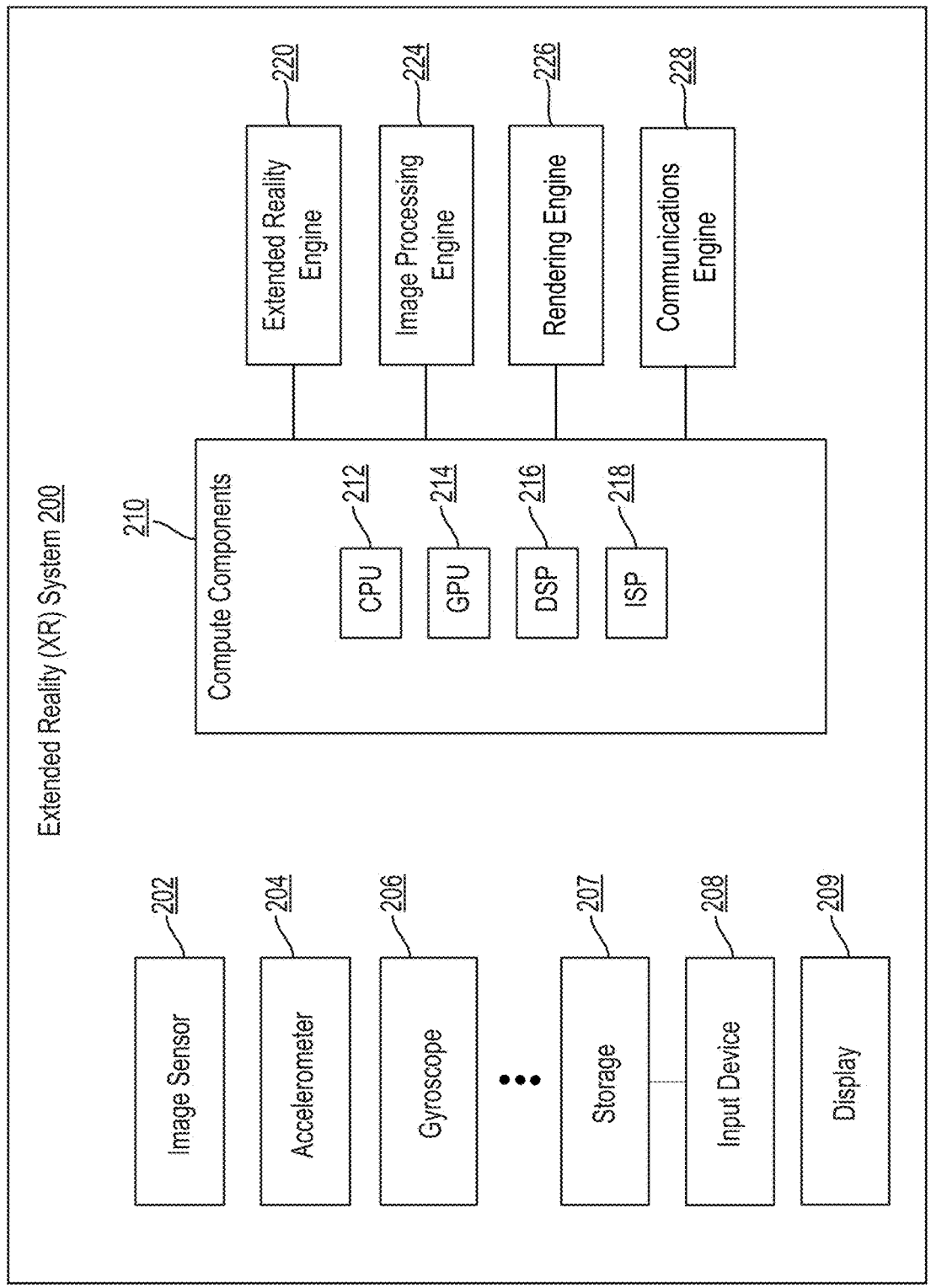
FIG. 2 is a diagram illustrating an architecture of an example extended reality (XR) system, in accordance with some aspects of the disclosure.

FIG. 2 is a diagram illustrating an architecture of an example extended reality (XR) system 200, in accordance with some aspects of the disclosure. In some examples, the extended reality (XR) system 200 of FIG. 2 can include the image capture and processing system 100, the image capture device 105A, the image processing device 105B, or a combination thereof. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, and a communications engine 228. It should be noted that the components 202-228 shown in FIG. 2 are non-limiting examples provided for illustrative and explanation purposes, and other examples can include more, fewer, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one or more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 1140 of FIG. 11.

In some implementations, the one or more image sensors 202, the accelerometer 204, the gyroscope 206, storage 207, compute components 210, XR engine 220, image processing engine 224, and rendering engine 226 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an XR device (e.g., an HMD, AR or MR glasses, etc.), smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g., roll, pitch, and yaw relative to the same frame of reference). In some implementations, the camera pose can be determined for 3-Degrees Of Freedom (3DoF), which refers to the three angular components (e.g., roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown). SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

In one or more aspects, machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding the output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure.

Figure 3:
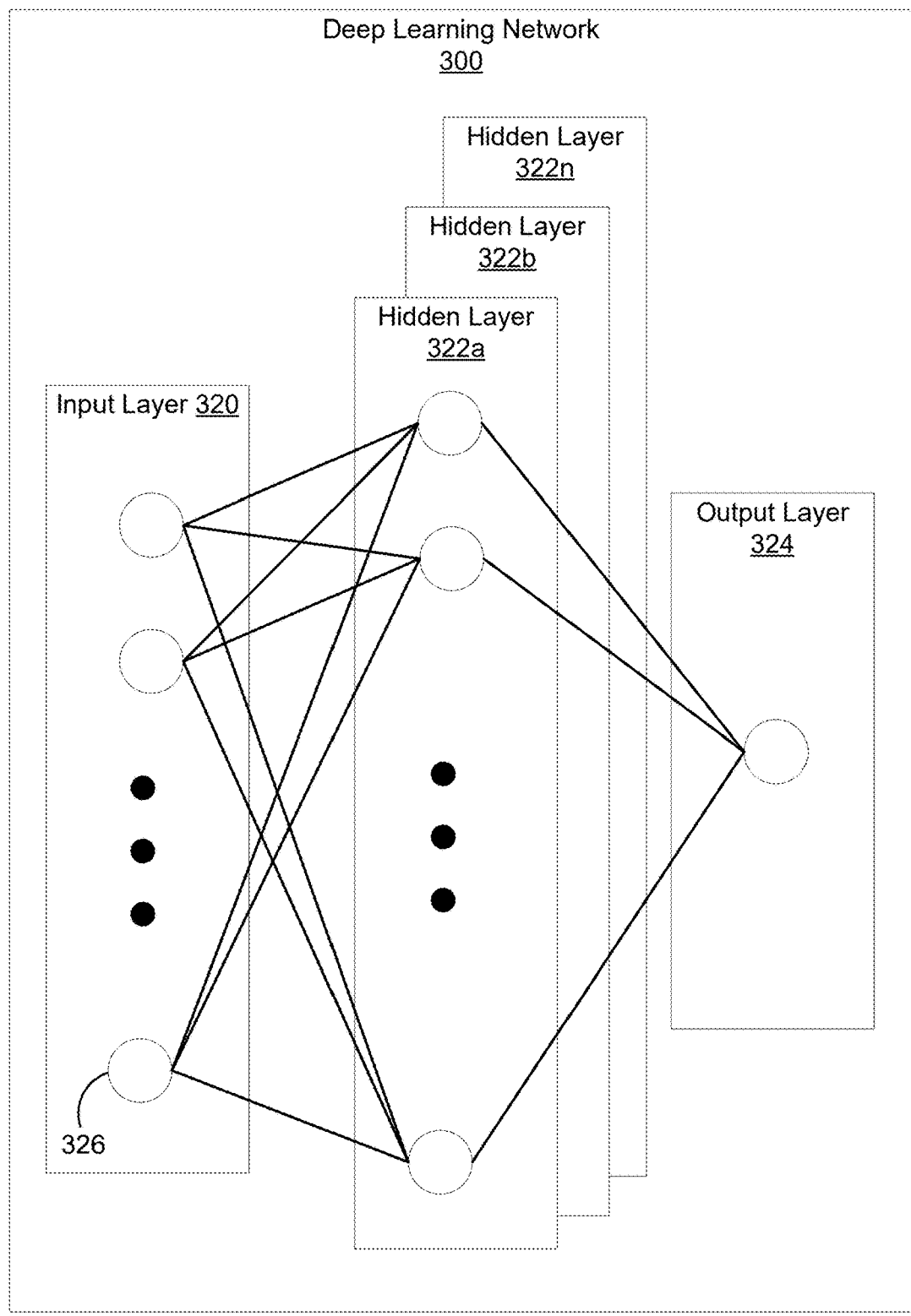
FIG. 3 is a block diagram illustrating an example of a deep learning network, in accordance with some aspects of the present disclosure.

FIG. 3 is an illustrative example of a deep learning neural network 300 that may be employed (e.g., for model 640 of FIG. 6, model 940 of FIG. 9, and/or model 960 of FIG. 9) for novel view synthesis (e.g., real-time or near real-time novel view synthesis) from images and/or video (e.g., RGBD images and/or video) using model-based inpainting. An input layer 320 includes input data. In some examples, the input layer 320 can include data representing the pixels of an input video frame. The neural network 300 includes multiple hidden layers 322a, 322b, through 322n. The hidden layers 322a, 322b, through 322n include "n" number of hidden layers, where "n" is an integer greater than or equal to one. The number of hidden layers can be made to include as many layers as needed for the given application. The neural network 300 further includes an output layer 324 that provides an output resulting from the processing performed by the hidden layers 322a, 322b, through 322n. In some examples, the output layer 324 can provide a classification for an object in an input video frame. The classification can include a class identifying the type of object (e.g., a person, a dog, a cat, or other object).

The neural network 300 is a multi-layer neural network of interconnected nodes. Each node can represent a piece of information. Information associated with the nodes is shared among the different layers and each layer retains information as information is processed. In some cases, the neural network 300 can include a feed-forward network, in which case there are no feedback connections where outputs of the network are fed back into itself. In some cases, the neural network 300 can include a recurrent neural network, which can have loops that allow information to be carried across nodes while reading in input.

Information can be exchanged between nodes through node-to-node interconnections between the various layers. Nodes of the input layer 320 can activate a set of nodes in the first hidden layer 322a. For example, as shown, each of the input nodes of the input layer 320 is connected to each of the nodes of the first hidden layer 322a. The nodes of the hidden layers 322a, 322b, through 322n can transform the information of each input node by applying activation functions to the information. The information derived from the transformation can then be passed to and can activate the nodes of the next hidden layer 322b, which can perform their own designated functions. Example functions include convolutional, up-sampling, data transformation, and/or any other suitable functions. The output of the hidden layer 322b can then activate nodes of the next hidden layer, and so on. The output of the last hidden layer 322n can activate one or more nodes of the output layer 324, at which an output is provided. In some cases, while nodes (e.g., node 326) in the neural network 300 are shown as having multiple output lines, a node has a single output and all lines shown as being output from a node represent the same output value.

In some cases, each node or interconnection between nodes can have a weight that is a set of parameters derived from the training of the neural network 300. Once the neural network 300 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 300 to be adaptive to inputs and able to learn as more and more data is processed.

The neural network 300 is pre-trained to process the features from the data in the input layer 320 using the different hidden layers 322a, 322b, through 322n in order to provide the output through the output layer 324. In an example in which the neural network 300 is used to identify objects in images, the neural network 300 can be trained using training data that includes both images and labels. For instance, training images can be input into the network, with each training image having a label indicating the classes of the one or more objects in each image (basically, indicating to the network what the objects are and what features they have). In some examples, a training image can include an image of a number 2, in which case the label for the image can be [0 0 1 0 0 0 0 0 0 0].

In some cases, the neural network 300 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 300 is trained well enough so that the weights of the layers are accurately tuned.

For the example of identifying objects in images, the forward pass can include passing a training image through the neural network 300. The weights are initially randomized before the neural network 300 is trained. The image can include, for example, an array of numbers representing the pixels of the image. Each number in the array can include a value from 0 to 255 describing the pixel intensity at that position in the array. In some examples, the array can include a 28×28×3 array of numbers with 28 rows and 28 columns of pixels and 3 color components (such as red, green, and blue, or luma and two chroma components, or the like).

For a first training iteration for the neural network 300, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 300 is unable to determine low level features and thus cannot make an accurate determination of what the classification of the object might be. A loss function can be used to analyze error in the output. Any suitable loss function definition can be used. An example of a loss function includes a mean squared error (MSE). The MSE is defined as $E_{total}=\Sigma \frac{1}{2}(\text{target}-\text{output})^2$, which calculates the sum of one-half times a ground truth output (e.g., the actual answer) minus the predicted output (e.g., the predicted answer) squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 300 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

The neural network 300 can include any suitable deep network. As described previously, an example of a neural network 300 includes a convolutional neural network (CNN), which includes an input layer and an output layer, with multiple hidden layers between the input and out layers. An example of a CNN is described below with respect to FIG. 4. The hidden layers of a CNN include a series of convolutional, nonlinear, pooling (for downsampling), and fully connected layers. The neural network 300 can include any other deep network other than a CNN, such as an autoencoder, a deep belief nets (DBNs), a Recurrent Neural Networks (RNNs), among others.

Figure 4:
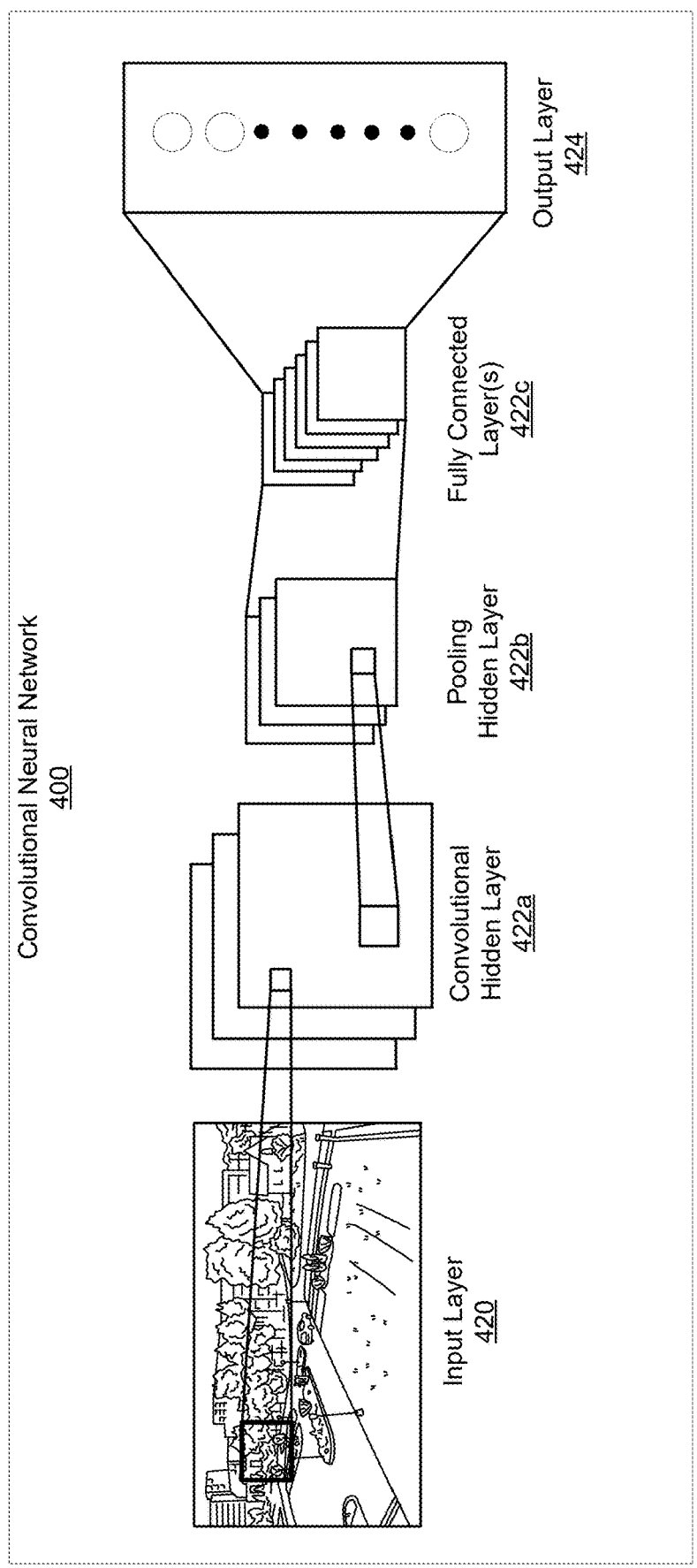
FIG. 4 is a block diagram illustrating an example of a convolutional neural network, in accordance with some aspects of the present disclosure.

FIG. 4 is an illustrative example of a convolutional neural network 400 (CNN 400). The input layer 420 of the CNN 400 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 422a, an optional non-linear activation layer, a pooling hidden layer 422b, and fully connected hidden layers 422c to get an output at the output layer 424. While only one of each hidden layer is shown in FIG. 4, one of ordinary skill will appreciate that multiple convolutional hidden layers, non-linear layers, pooling hidden layers, and/or fully connected layers can be included in the CNN 400. As previously described, the output can indicate a single class of an object or can include a probability of classes that best describe the object in the image.

The first layer of the CNN 400 is the convolutional hidden layer 422a. The convolutional hidden layer 422a analyzes the image data of the input layer 420. Each node of the convolutional hidden layer 422a is connected to a region of nodes (pixels) of the input image called a receptive field. The convolutional hidden layer 422a can be considered as one or more filters (each filter corresponding to a different activation or feature map), with each convolutional iteration of a filter being a node or neuron of the convolutional hidden layer 422a. For example, the region of the input image that a filter covers at each convolutional iteration would be the receptive field for the filter. In some examples, if the input image includes a 28×28 array, and each filter (and corresponding receptive field) is a 5×5 array, then there will be 24×24 nodes in the convolutional hidden layer 422a. Each connection between a node and a receptive field for that node learns a weight and, in some cases, an overall bias such that each node learns to analyze its particular local receptive field in the input image. Each node of the hidden layer 422a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 422a is due to each node of the convolutional layer being applied to its corresponding receptive field. For example, a filter of the convolutional hidden layer 422a can begin in the top-left corner of the input image array and can convolve around the input image. As noted above, each convolutional iteration of the filter can be considered a node or neuron of the convolutional hidden layer 422a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 422a.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 422a.

The mapping from the input layer to the convolutional hidden layer 422a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 422a can include several activation maps in order to identify multiple features in an image. The example shown in FIG. 4 includes three activation maps. Using three activation maps, the convolutional hidden layer 422a can detect three different kinds of features, with each feature being detectable across the entire image.

In some examples, a non-linear hidden layer can be applied after the convolutional hidden layer 422a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 400 without affecting the receptive fields of the convolutional hidden layer 422a.

The pooling hidden layer 422b can be applied after the convolutional hidden layer 422a (and after the non-linear hidden layer when used). The pooling hidden layer 422b is used to simplify the information in the output from the convolutional hidden layer 422a. For example, the pooling hidden layer 422b can take each activation map output from the convolutional hidden layer 422a and generates a condensed activation map (or feature map) using a pooling function. Max-pooling is an example of a function performed by a pooling hidden layer. Other forms of pooling functions be used by the pooling hidden layer 422a, such as average pooling, L2-norm pooling, or other suitable pooling functions. A pooling function (e.g., a max-pooling filter, an L2-norm filter, or other suitable pooling filter) is applied to each activation map included in the convolutional hidden layer 422a. In the example shown in FIG. 4, three pooling filters are used for the three activation maps in the convolutional hidden layer 422a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 422a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 422a having a dimension of 24×24 nodes, the output from the pooling hidden layer 422b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 400.

The final layer of connections in the network is a fully-connected layer that connects every node from the pooling hidden layer 422b to every one of the output nodes in the output layer 424. Using the example above, the input layer includes 28×28 nodes encoding the pixel intensities of the input image, the convolutional hidden layer 422*a* includes 3×24×24 hidden feature nodes based on application of a 5×5 local receptive field (for the filters) to three activation maps, and the pooling layer 422*b* includes a layer of 3×12×12 hidden feature nodes based on application of max-pooling filter to 2×2 regions across each of the three feature maps. Extending this example, the output layer 424 can include ten output nodes. In such an example, every node of the 3×12×12 pooling hidden layer 422*b* is connected to every node of the output layer 424.

The fully connected layer 422*c* can obtain the output of the previous pooling layer 422*b* (which should represent the activation maps of high-level features) and determines the features that most correlate to a particular class. For example, the fully connected layer 422*c* layer can determine the high-level features that most strongly correlate to a particular class, and can include weights (nodes) for the high-level features. A product can be computed between the weights of the fully connected layer 422*c* and the pooling hidden layer 422*b* to obtain probabilities for the different classes. For example, if the CNN 400 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 424 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In some examples, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

As previously mentioned, for image processing, rendering views of a scene in real time using a sparse set of available image frames may improve the way content can be consumed for VR applications, which can lead to an immersive VR experience for a user. For example, given a recorded stereo or mono color video of a static scene, it is desirable to render the scene from any given viewpoint such that the end user can view the scene from the user's own perspective.

For a shared experience, a scene can be captured in two-dimensions (e.g., in 2D images) by a user's device (e.g., a mobile phone) to be visualized by another user in VR (e.g., via an HMD). Various techniques can be performed to provide a shared experience of a scene. One technique involves playing the video just as it was captured. For this solution, however, the video will be decoupled from the user's head movement and, thus, when the user is viewing the video, the user can become nauseous if the camera motion is high.

Another technique involves stitching together 2D images (e.g., RGB images) of the scene to create a stereoscopic 360 degree video or image of the scene. This solution, however, only allows for 3 DoF and, as such, there is no 6 DoF support.

Figure 5:
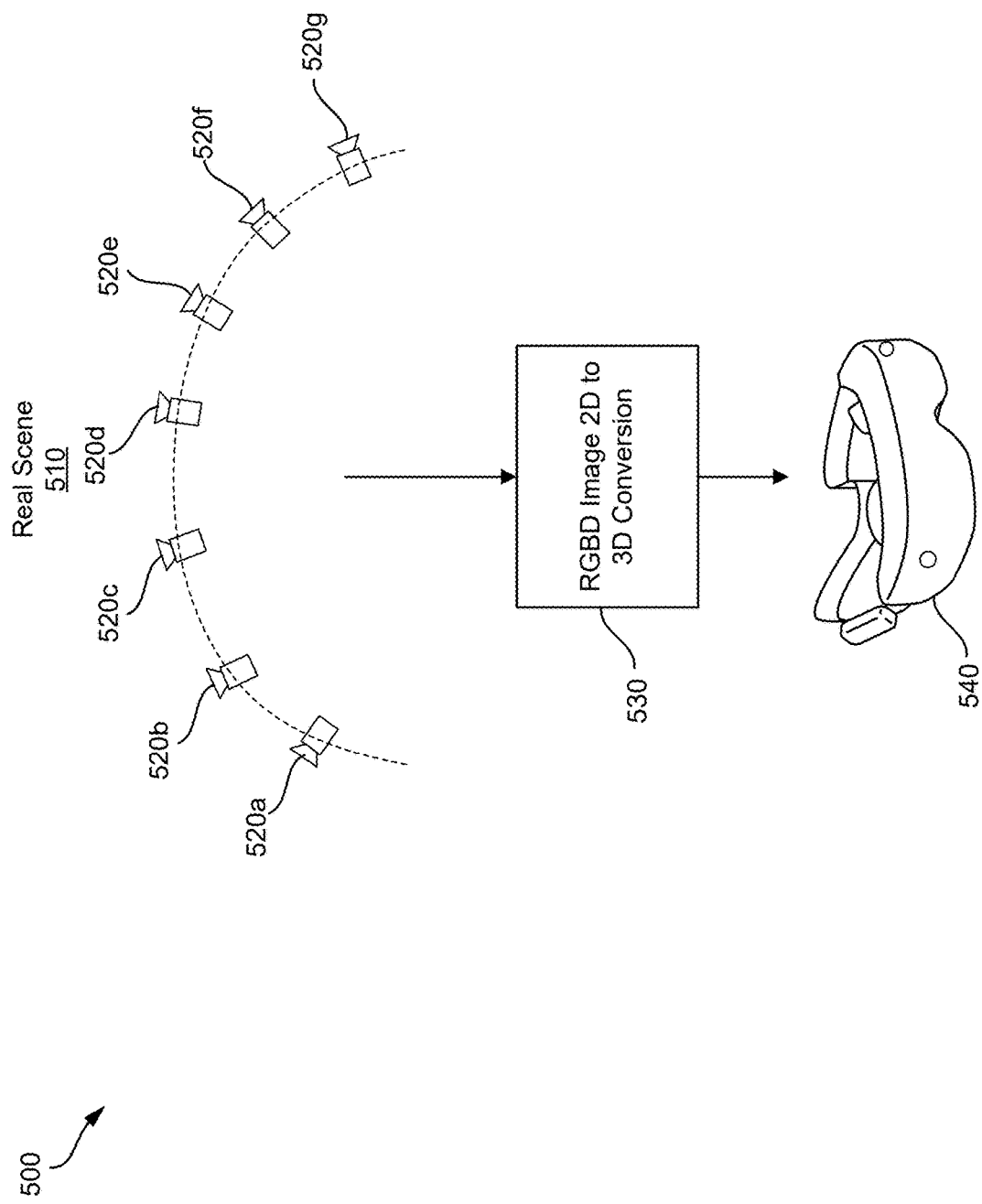
FIG. 5 is a diagram illustrating an example of conversion of 2D RGBD images of a scene to generate an implicit three-dimensional (3D) scene representation, in accordance with some aspects of the present disclosure.

Another technique involves converting (e.g., by using SfM or NeRF models) 2D RGBD images of a scene to generate an implicit 3D scene representation. FIG. 5 shows an example of this solution. In particular, FIG. 5 is a diagram illustrating an example 500 of conversion (e.g., by using SfM or NeRF models) of 2D RGBD images of a scene to generate an implicit 3D scene representation. In FIG. 5, 2D RGBD images are captured of a real scene 510 using plurality of different camera poses 520*a*, 520*b*, 520*c*, 520*d*, 520*e*, 520*f*, 520*g*. In block 530 of FIG. 5, the RGBD images may be converted to a 3D scene representation, which may be viewed on an HMD 540 of a user.

For this solution, however, the 3D scene computation can be computationally intensive. This solution can also require a large memory footprint because of a higher storage requirement to store the 3D scene. In addition, for this solution, the synthesized images may not be of high quality.

Therefore, improved systems and techniques for a shared experience using images (e.g., RGBD images or video frames) that allow for high-quality real-time or near real-time consumption in VR, along with low computation and memory footprint requirements, can be useful.

In one or more aspects, the systems and techniques provide novel view synthesis (e.g., real-time or near real-time novel view synthesis) from images and/or video (e.g., RGBD images or video frames) using model-based inpainting. In one or more examples, the systems and techniques convert captured images (e.g., RGBD images or video frames) to an implicit representation of a 3D scene (with a low memory footprint and high quality real-time or near real-time consumption in VR) using a combination of a novel view synthesis model (e.g., a NeRF model or a Gaussian splatting model), depth-based reprojection, and an inpainting model (e.g., a generative AI model). For the systems and techniques, the advantages of a novel view synthesis model, depth reprojection, and an inpainting model are combined together into a single framework.

In one or more examples, depth-based reprojection for novel view synthesis can produce good quality images, except at object boundaries, which can be left as hole regions within the image. Depth-based reprojection involves reprojecting an image (e.g., an initial image) from a rendered pose to a display pose (e.g., a pose of an XR device of a user, such as an HMD, AR or MR glasses, etc.) using a depth map corresponding to the image. When regions of the depth map have depth that is not continuous, after the depth-based reprojection, spatial artifacts (e.g., stretching or hole regions) can result, which can adversely affect the VR experience for the user.

The systems and techniques utilize a novel view synthesis model (e.g., a NeRF model or a Gaussian Splatting model) that may learn a 3D representation of the scene to obtain low resolution data for the hole regions. For example, the novel view synthesis model may learn the 3D structure of the scene by using low resolution 2D images (e.g., RGBD images) with different camera poses captured from the scene, and can render the scene given a display pose of a user's device (e.g., an XR device, such as an HMD, AR or MR glasses, etc.). The novel view synthesis model may output per pixel color information (e.g., an RGB image) for the scene with low resolution. For the systems and techniques, an inpainting model (e.g., a generative AI model) may be trained to inpaint (e.g., fill in with pixels) the hole regions in a depth-based reprojected image of the scene taking guidance from the low resolution data from the novel view synthesis model (e.g., NeRF model).

In one or more examples, the systems and techniques provide a method for free viewpoint rendering of scene given images and/or video (e.g., RGBD images or video frames) and camera poses of each image/frame captured using mono or stereo camera. This method combines the capabilities of a novel view synthesis model (e.g., a NeRF model), depth based reprojection, and an inpainting model (e.g., a generative AI model) under one bundle to enable view synthesis (e.g., real-time or near real-time view synthesis) during consumption with a low memory footprint. In some examples, 3D scene data can be encoded as novel view synthesis model weights from a mono or stereo video. In one or more examples, hole regions within depth reprojected images can be inpainted using an inpainting model, which uses low resolution images from a novel view synthesis model as a prior. In one or more examples, a method is provided that queries nearest neighbor camera poses based on a display pose of a user's device (e.g., an XR device, such as an HMD, AR or MR glasses, etc.), performs depth-based reprojection, and performs composition to minimize spatial artifacts, such as stretching and hole regions. In some examples, a method is provided that can encode image frames into a bitstream and store the bitstream on a disk or cloud server. During consumption, the model may decode only the image frames of the queried camera poses.

Figure 6:
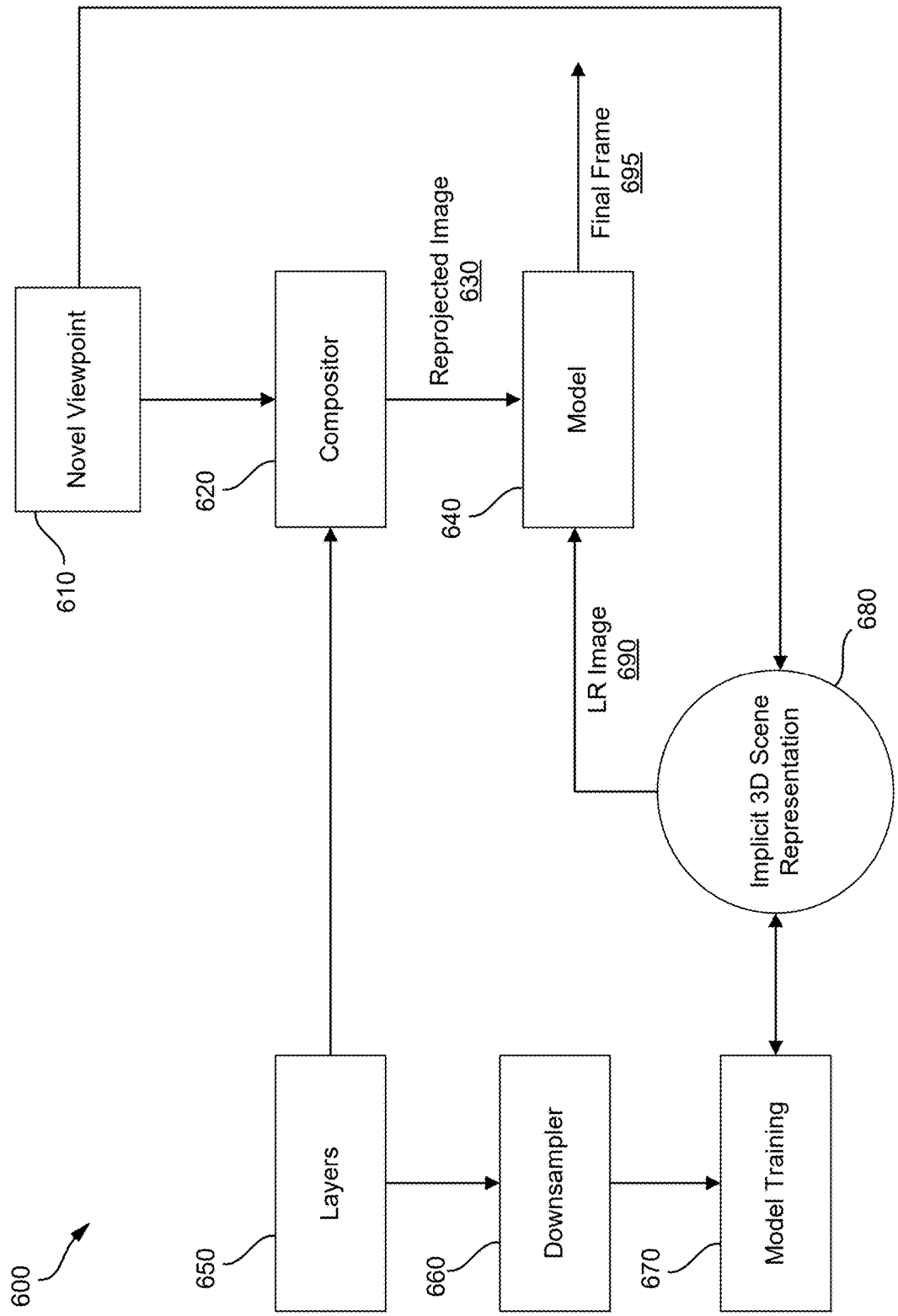
FIG. 6 is a diagram illustrating an example of a process for novel view synthesis (e.g., real-time or near real-time novel view synthesis) from RGBD video using model-based inpainting, in accordance with some aspects of the present disclosure.

FIG. 6 is a diagram illustrating an example of a process 600 for novel view synthesis (e.g., real-time or near real-time novel view synthesis) from images and/or video (e.g., RGBD images or video frames) using model-based inpainting. In FIG. 6, a plurality of layers 650 (e.g., RGBD layers) can be obtained, which may be referred to as initial layers or initial camera layers. The plurality of layers 650 can include a plurality of images (e.g., a plurality of RGBD images). For example, each layer of the plurality of layers 650 can include a respective image (e.g., a 2D RGB image) of a scene and a respective pose of a camera of a device when capturing the respective image of the scene. In one or more examples, the plurality of layers 650 may have a first resolution (e.g., a low resolution). The images of the plurality of layers 650 can be downsampled (e.g., by a downsampler 660) to produce downsampled images of the plurality of layers 650 that have a lower resolution (e.g., a first resolution, referred to as a low resolution) than the images of the plurality of layers 650 (e.g., having a second resolution that is higher than the first resolution). In one or more examples, the low resolution refers to the downsampled images having less pixels than the higher-resolution images of plurality of layers 650. In some cases, the downsampler 660 can temporally downsample the images of the plurality of layers 650, such as by generating a subset of the images of the plurality of layers 650, which can be referred to as a subset of the plurality of layers 650. The subset of the plurality of layers 650 includes less images than the images of the plurality of layers 650.

Model training 670 of a novel view synthesis model (e.g., a NeRF model) for the scene can be performed using the downsampled images (and in some cases the subset of the plurality of layers 650). The novel view synthesis model can be trained, based on the downsampled images of the plurality of layers 650 (and in some cases the subset of the plurality of layers 650), to learn an implicit 3D scene representation 680. The training of the novel view synthesis model is scene specific. After the novel view synthesis model is trained for the scene, the novel view synthesis model can generate, based on a pose for the device, low resolution (LR) data (e.g., LR image 690) for hole regions (e.g., regions missing pixels) within a depth-based reprojected image 630 of the scene. The pose for the device can be a novel viewpoint 610, which may be a display pose of a camera of the user's device, such as an XR device (e.g., an HMD, AR or MR glasses, etc.). The novel viewpoint 610 can be provided to the compositor 620. The novel viewpoint 610 can also be provided to the implicit 3D scene representation model 680, for example to provide the LR image 690 from that particular view point.

Another plurality of layers can be generated by depth-based reprojection of the plurality of layers 650 (e.g., RGBD layers) of the scene. In some examples, the plurality of layers 650 may have a second resolution (e.g., a high resolution). This generated plurality of layers (e.g., which may have the second resolution, which may be a high resolution) can be composited (e.g., the layers may be combined, by a compositor 620, to correct pixel placement within images of the layers, for example when some pixels are seen by one camera pose, but not by another camera pose) based on a pose for the device (e.g., the novel viewpoint 610) to produce a plurality of composited layers.

A model 640 (e.g., an inpainting model) can determine (e.g., inpaint) pixels for the hole regions within the depth-based reprojected image 630 (e.g., of the plurality of composited layers) to produce a final frame 695. The determining (e.g., inpainting) of the pixels can be based on the plurality of composite layers and the LR data (e.g., LR image 690). In one or more examples, the model 640 can use the LR data (e.g., LR image 690) as a guide for the determining (e.g., the inpainting) of the pixels. The model 695 can then output the final frame 695 of the scene.

Figure 7:
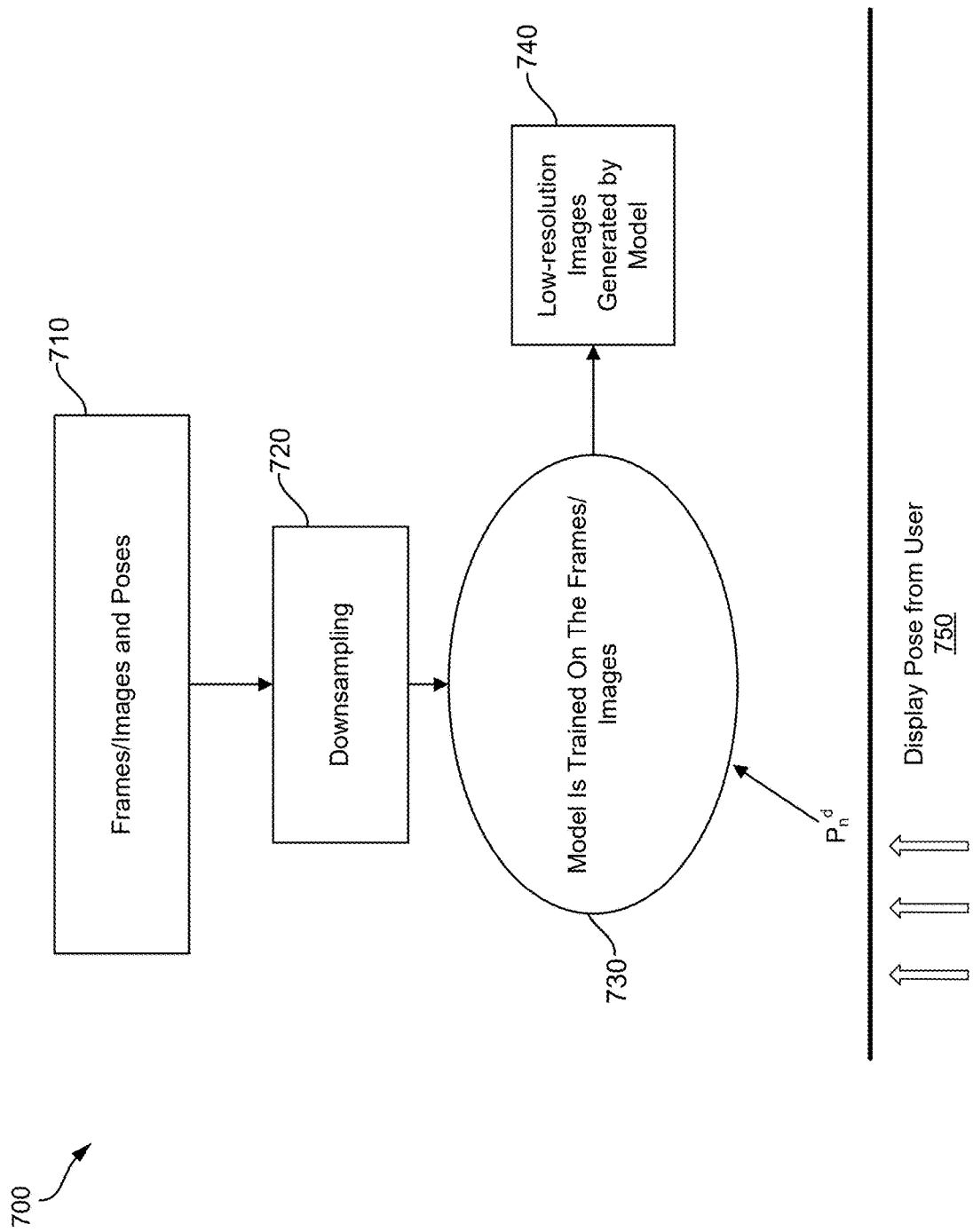
FIG. 7 is a diagram illustrating an example of a process for training and operation of a novel view synthesis model, in accordance with some aspects of the present disclosure.

FIG. 7 shows an example of training and operation of a novel view synthesis model. In particular, FIG. 7 is a diagram illustrating an example of a process 700 for training and operation of a novel view synthesis model. In FIG. 7, during training, the novel view synthesis model can learn a 3D scene from a sparse set of 2D images along with their corresponding camera poses. In one or more examples, various different types of models may be employed for the novel view synthesis model. In some examples, any neural or non-neural model, which can learn a 3D structure of a scene by only using 2D images of the scene along with their corresponding camera poses and can output an actual RGB image for the scene, may be employed for the novel view synthesis model. In one or more examples, a NeRF model or a Gaussian Splatting model may be employed for the novel view synthesis model.

In FIG. 7, a plurality of camera layers (e.g., including RGBD frames from captured video and pose metadata, for example frames (or images) and poses 710 (e.g., RGBD images/frames and poses), and also including depth, which may be obtained by inference, such as from stereo images, and/or from sensors, such as depth sensors and/or LIDAR) can be downsampled (e.g.s, down sampling 720) to produce downsampled images (e.g., a subset of camera layers) having a lower resolution (e.g., a lower number of pixels) as compared to the images of the plurality of camera layers. In one or more examples, the images of the subset of camera layers have a first resolution (e.g., a low resolution) and the plurality of camera layers have a second resolution (e.g., a higher resolution than the low resolution).

In FIG. 7, at block 730, the novel view synthesis model can then be trained on the subset of the camera layers (e.g., including RGBD frames) to learn novel view synthesis model weights. The downsampling to produce the down-sample images of the camera layers can allow for a reduction in training time and required memory for the novel view synthesis model.

Once trained, the novel view synthesis model has learned a continuous 3D scene, and can then render the scene given any camera display pose ($P_n^d$) from a user 750. Given a display pose ($P^d$) for a camera of a device (e.g., an XR device associated with a user, such as an HMD, AR or MR glasses, etc.), after the novel view synthesis model has been trained, the novel view synthesis model can generate and output low resolution (LR) images 740 of the scene corresponding to the display pose ($P^d$) for the camera of the device.

In one or more examples, the LR images 740 can be sent (e.g., transmitted) along with an encoded video bitstream (e.g., including encoded RGBD frames of the scene) to the device (e.g., the XR device). In some examples, a pose tracker (e.g., a 6 DoF pose tracker) associated with the device (e.g., an HDM associated with the user) can provide the display pose ($P^d$) for the camera of the device to the novel view synthesis model. Based on the display pose ($P^d$) for the camera of the device, the novel view synthesis model can render the scene. In one or more examples, the novel view synthesis model can render the scene separately for the left and right displays (e.g., left eye display and right eye display) of the device to enable a 3D experience for the user.

Figure 8:
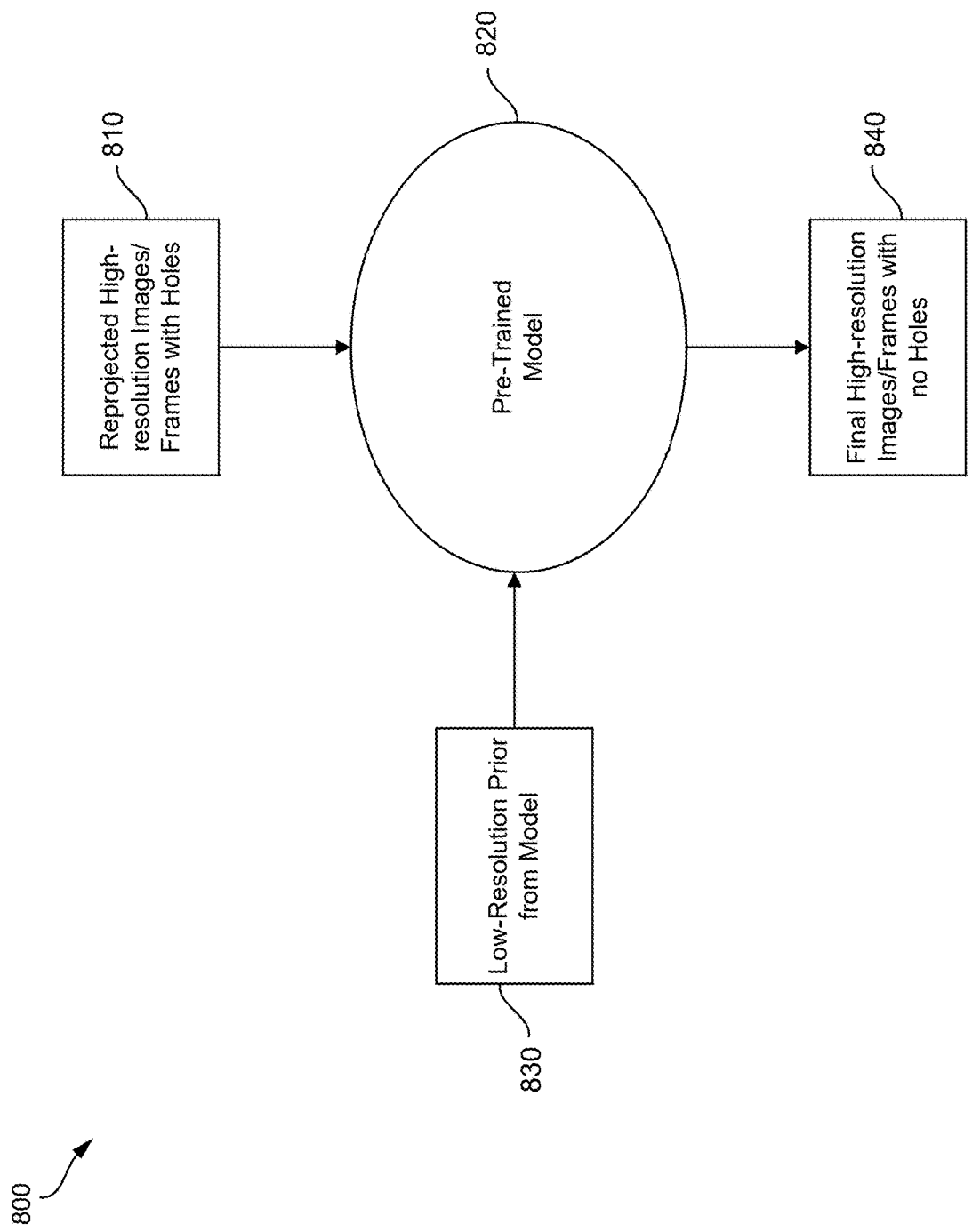
FIG. 8 is a diagram illustrating an example of inpainting hole regions within a depth-based reprojected image of a scene, in accordance with some aspects of the present disclosure.

FIG. 8 shows an example of determining (e.g., inpainting) pixels for regions of a depth-based reprojected image (e.g., depth-based reprojected image 630 of FIG. 6). In particular, FIG. 8 is a diagram illustrating an example 800 of inpainting hole regions within a depth-based reprojected image of a scene. In FIG. 8, by using depth based reprojection of nearest camera frames (e.g., camera frames with associated camera poses that are proximate (e.g., near) the display pose of the camera of the device), a high resolution (HR) image frame that includes hole regions located at locations with depth discontinuities (e.g., a reprojected HR image with holes 810) can be obtained. Given the display pose of the camera of the device (e.g., the XR device), a novel view synthesis model can output low resolution (LR) image frames (e.g., an LR prior from model 830) using learned weights from the training of the novel view synthesis model.

An inpainting model (e.g., a pre-trained model 820, which may be a machine learning model, such as a diffusion-based model) can take guidance from the LR image frames (e.g., LR prior from model 830) to inpaint (e.g., fill in) pixels into the hole regions in the HR image frame to generate a final HR image frame without any hole regions (e.g., final HR image with no holes 840). The inpainting model (e.g., a diffusion-based model) can be pretrained to inpaint (e.g., fill in) pixels into mask regions (e.g., denoting the hole regions) given the LR prior from the model 830.

Figure 9:
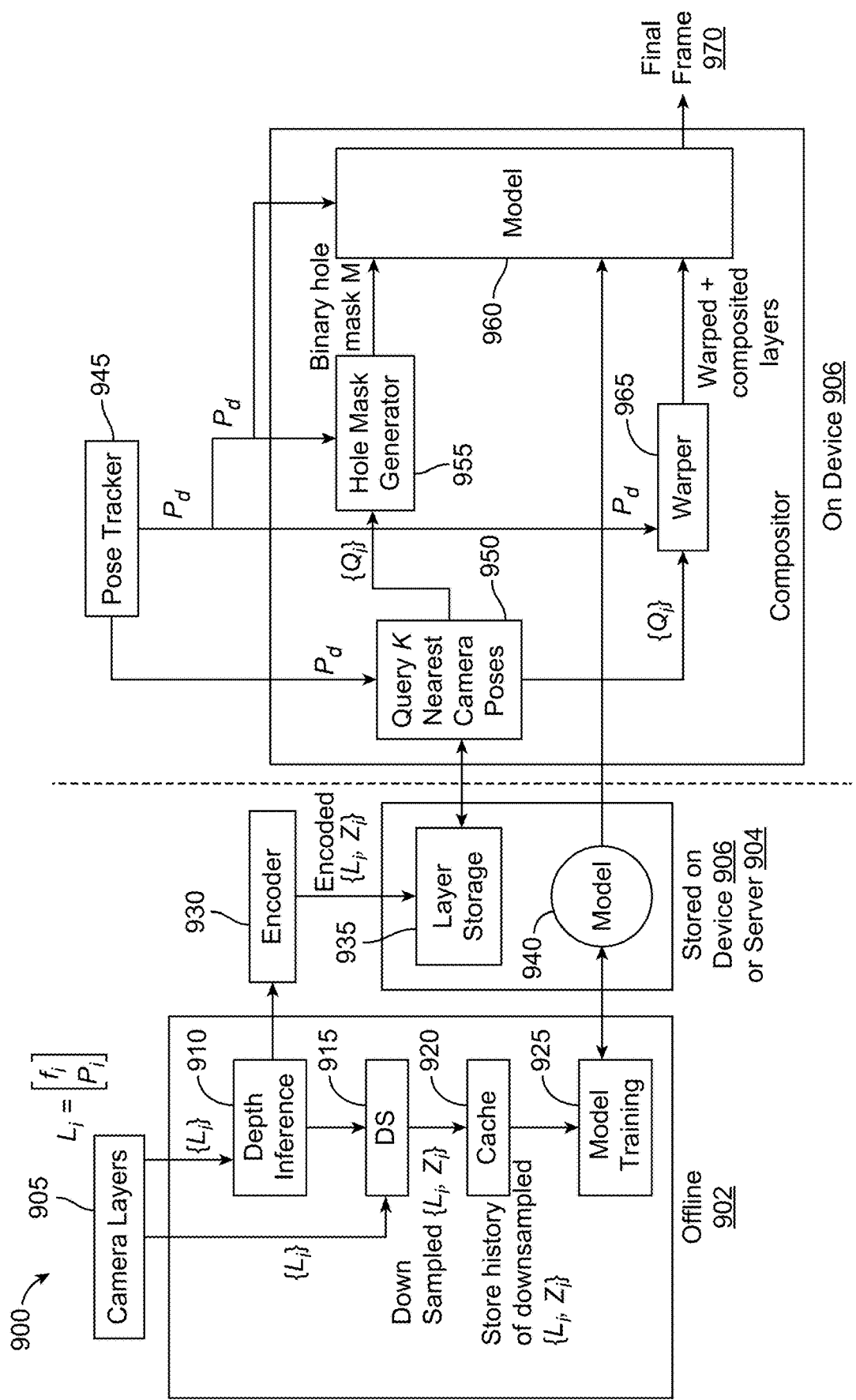
FIG. 9 is a diagram illustrating an example of a detailed process for novel view (e.g., real-time or near real-time novel view synthesis) synthesis from RGBD video using model-based inpainting, in accordance with some aspects of the present disclosure.

FIG. 9 shows an example of for novel view synthesis (e.g., real-time or near real-time novel view synthesis) from images and/or video (e.g., RGBD images or video frames) using model-based inpainting. In particular, FIG. 9 is a diagram illustrating an example of a system 900 implementing a detailed process for novel view synthesis from RGBD video using model-based inpainting. The system 900 includes a model 940 (e.g., a novel view synthesis model), which may be pretrained (e.g., during model training 925) offline 902 (e.g., on a server). In one or more examples, the model 940 (e.g., a novel view synthesis model) may be a NeRF model or a Gaussian splatting model. In some examples, the model 940 may be trained on a device 906 (e.g., an XR device, such as an HMD, AR glasses, etc.) associated with a user.

For the training of the model 940, camera layers (e.g., RGBD layer information 905) associated with a scene with a resolution (e.g., a low resolution) can be down sampled (e.g., DS 915) to generate downsampled images of the camera layers (e.g., with a low resolution) and depth information $Z_i$. In some cases, the images of the camera layers can be temporally downsampled. For instance, a subset of images of the plurality of layers 650 can be generated (referred to as a subset of camera layers), where the subset of camera layers includes less images than the images of the plurality of camera layers. Each layer ($L_i$) of the camera layers (e.g., RGBD layer information 905) can include a respective RGB image frame ($f_i$) of a scene captured by a camera associated with the device and a respective pose ($P_i$) of the camera (e.g., pose metadata) when capturing the image as well as depth ($Z_i$) for the image frame. The downsampled images of the camera layers $L_i$ (and in some cases the subset of camera layers) and depth information $Z_i$ can be stored within a cache 920 located offline 902 (e.g., on a server). The model 940 can use the downsampled images (and in some cases the subset of camera layers) stored within the cache 920 as an input for the training.

Depth (e.g., depth information $Z_i$) associated with images of camera layers 905 (e.g., defined by layer information, such as RGBD layer information) of the scene may be determined by inference (e.g., a depth inference 910) and/or by sensors (e.g., depth sensors and/or LIDAR). For instance, the depth inference 910 can include a machine learning model (e.g., a neural network model) trained to determine depth for images (e.g., a depth value for each pixel of the images or for a subset of all pixels of the images). The camera layers 905 may be referred to as initial camera layers. The images of the camera layers 905 have a resolution (e.g., a high resolution). The images of the camera layers 905 can be depth-based reprojected to produce camera layers including depth-based reprojected images (e.g., with a high resolution). These camera layers with depth-based reprojected images may be encoded (e.g., by an encoder 930) into a bit stream to produce encoded camera layers with depth-based reprojected images (e.g., a high resolution). The encoded camera layers with depth-based reprojected images may be stored within layer storage 935, which may be located on the device or a server 904 (e.g., on a network or cloud server). The encoded bit stream may be sent (e.g., transmitted) from a server to the device.

A pose tracker 945 (e.g., a 6 DoF pose tracker) associated with the device can obtain a display pose ($P_d$) of a camera associated with the device, where the camera has a FOV of the scene. One or more processors (e.g. on the device 906) can determine a plurality (e.g., K number) of poses of the camera (and/or one or more other cameras) viewing the scene (e.g., query K nearest camera poses 950). The K nearest camera poses 950 can be of the same camera (e.g., the camera associated with the device) or of one or more different cameras (in addition to the camera associated with the device). The plurality of poses may be in proximity to the display pose ($P_d$) of the camera. For instance, in some examples, an FOV associated with each pose of the plurality of poses may intersect the FOV associated with the display pose ($P_d$) of the camera.

One or more processors (e.g., on the device 906) can obtain a set of camera layers ($Q_i$) from the layer storage 935. Each layer of the set of camera layers ($Q_i$) can include a respective image frame ($f_i$) (e.g., a depth-based reprojected image) of the scene captured by the camera (and/or the one or more other cameras) and a respective pose ($P_i$) of the plurality of poses of the camera (and/or the one or more other cameras) when capturing the image as well as an associated depth ($Z_i$) for the image frame. In one or more examples, the one or more processors may only decode the set of camera layers ($Q_i$) from the received encoded bit stream.

The one or more processors (e.g., on the device 906) can obtain, based on the display pose ($P_d$) of the camera and pixels within the set of camera layers ($Q_i$), a mask M (e.g., by a hole mask generator 955) indicating missing pixels within regions of an image (e.g., a depth-based reprojected image) of the scene corresponding to the display pose ($P_d$) of the camera.

The one or more processors (e.g., on the device 906) can composite (e.g., by a warper 965), based on the display pose ($P_d$) of the camera, the set of camera layers ($Q_i$) to generate a plurality of composited layers. The set of camera layers ($Q_i$) can be composited to correct pixel placement within images of the camera layers, for example when some pixels can be seen by one camera pose, but cannot by another camera pose.

A model 960 (e.g., an inpainting model) can determine pixels for the regions of the image (e.g., a depth-based reprojected image) of the scene based on the mask M, the plurality of composited layers, the display pose ($P_d$) of the camera, and a plurality of images (e.g., with a low resolution) of the scene. In one or more examples, the model 960 may be a diffusion model, a vision-based transformer model, or a GAN. In some examples, the plurality of images (e.g., with a low resolution) may be generated by the model 940 (e.g., after the model 940 has been trained) based on the display pose ($P_d$) of the camera. The model 960 can generate a final image frame 970 (e.g., with a high resolution) of the scene corresponding to the display pose ($P_d$) of the camera based on providing (e.g., inpainting) pixels to the regions of the image (e.g., a depth-based reprojected image) of the scene corresponding to the display pose ($P_d$) of the camera.

In one or more examples, when a scene is very large and complex, in order to improve the performance of the model 940, the model 940 may be finetuned (e.g., trained) on only image frames with corresponding camera poses that are proximate the display pose ($P_d$) of the camera. In some examples, in a split XR setup, the model 940 may be trained online (e.g., on the device 906) on a recent history of image frames.

Figure 10:
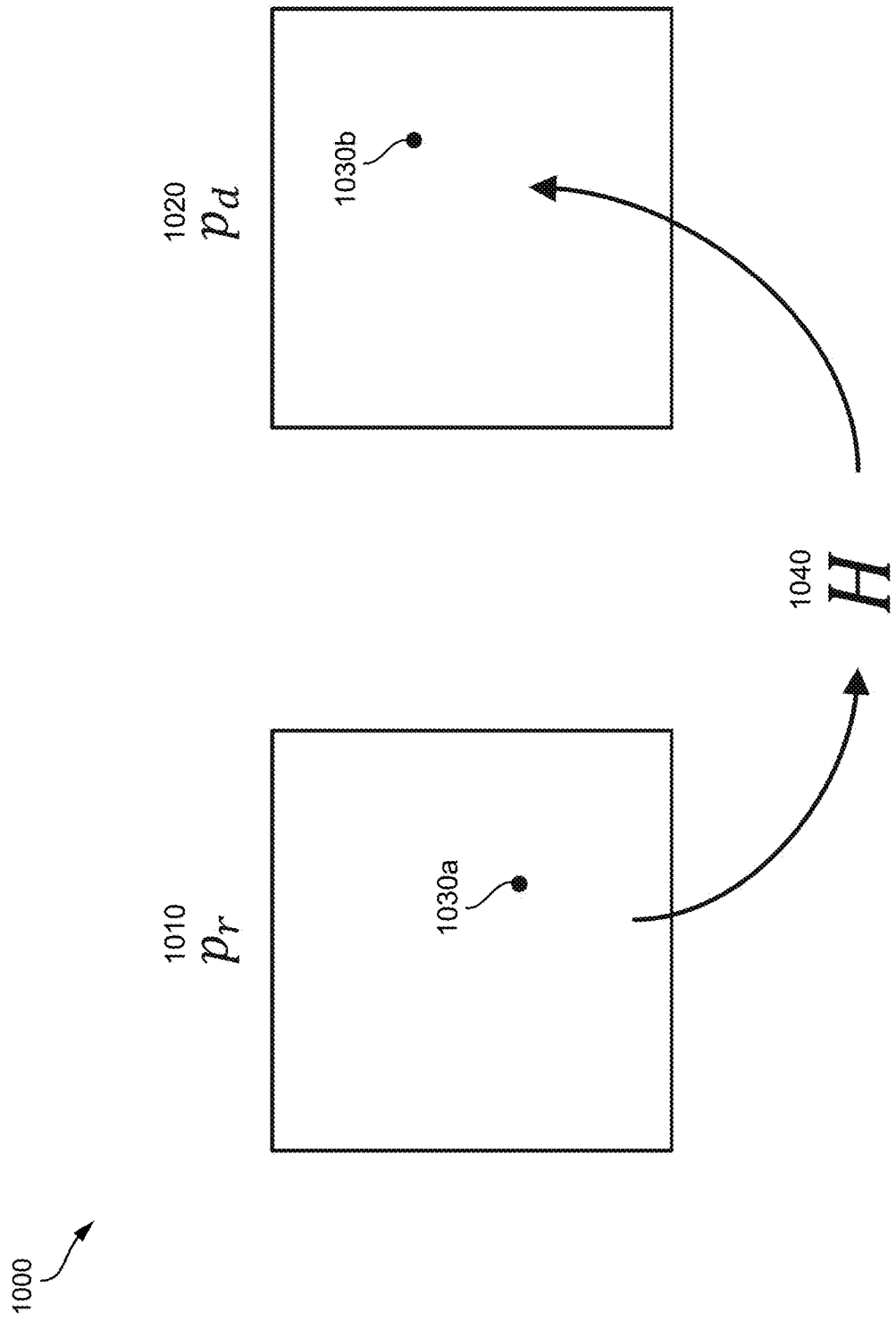
FIG. 10 is a diagram illustrating an example of a process for transforming a location of pixel in an image associated with a rendered pose to a location for that same pixel within an image associated with a display pose, in accordance with some aspects of the present disclosure.

FIG. 10 shows an example of transforming a location for a pixel in images of a scene with different associated poses. In particular, FIG. 10 is a diagram illustrating an example of a process 1000 for transforming a location 1030a of pixel in an image of a scene associated with a rendered pose ($P_r$) 1010 to a location 1030b for that same pixel within an image of the scene associated with a display pose ($P_d$) 1020. In one or more examples, a homography (H) 1040 can be used to transform a pixel location 1030a within an image associated with a rendered pose ($P_r$) 1010 to a pixel location 1030b within an image associated with a display pose ($P_d$) 1020. As such, the homography 1040 can be used to transform all locations for all pixels within an image associated with one camera pose to locations for all of the pixels in an image associated with another camera pose.

FIG. 11 shows an example of generating a mask (e.g., a hole mask). In particular, FIG. 11 is a diagram illustrating an example of a process 1100 for generating a mask. In one or more examples, during operation of the process 1100 for generating a mask, given a render space Z representation (e.g., a Z layers 1120) and a camera pose pair, which may include a rendered pose ($p_r$) and a display pose ($p_d$), one or more processors on a device can compute a homography (H) 1110 using the rendered pose ($p_r$), display pose ($p_d$), and camera intrinsics.

The one or more processors can initialize a mask output image (e.g., in a display space) with all zeros (0s). A compute shader 1130 may be employed to compute all of the pixels within the Z layers 1120. The compute shader 1130 can include a plurality of compute threads 1140. Each compute thread 1140 can compute one pixel within one layer of the Z layers 1120. For each pixel P(u, v) in the render space, a compute thread 1140 can forward project and perspective divide P to the display space using H to get P'(u', v'). The one or more processors can mark a one (1) at P' in the mask output image. The one or more processors can represent a final binary hole mask 1150, where zeros (0s) are located within the hole regions.

Figure 12:
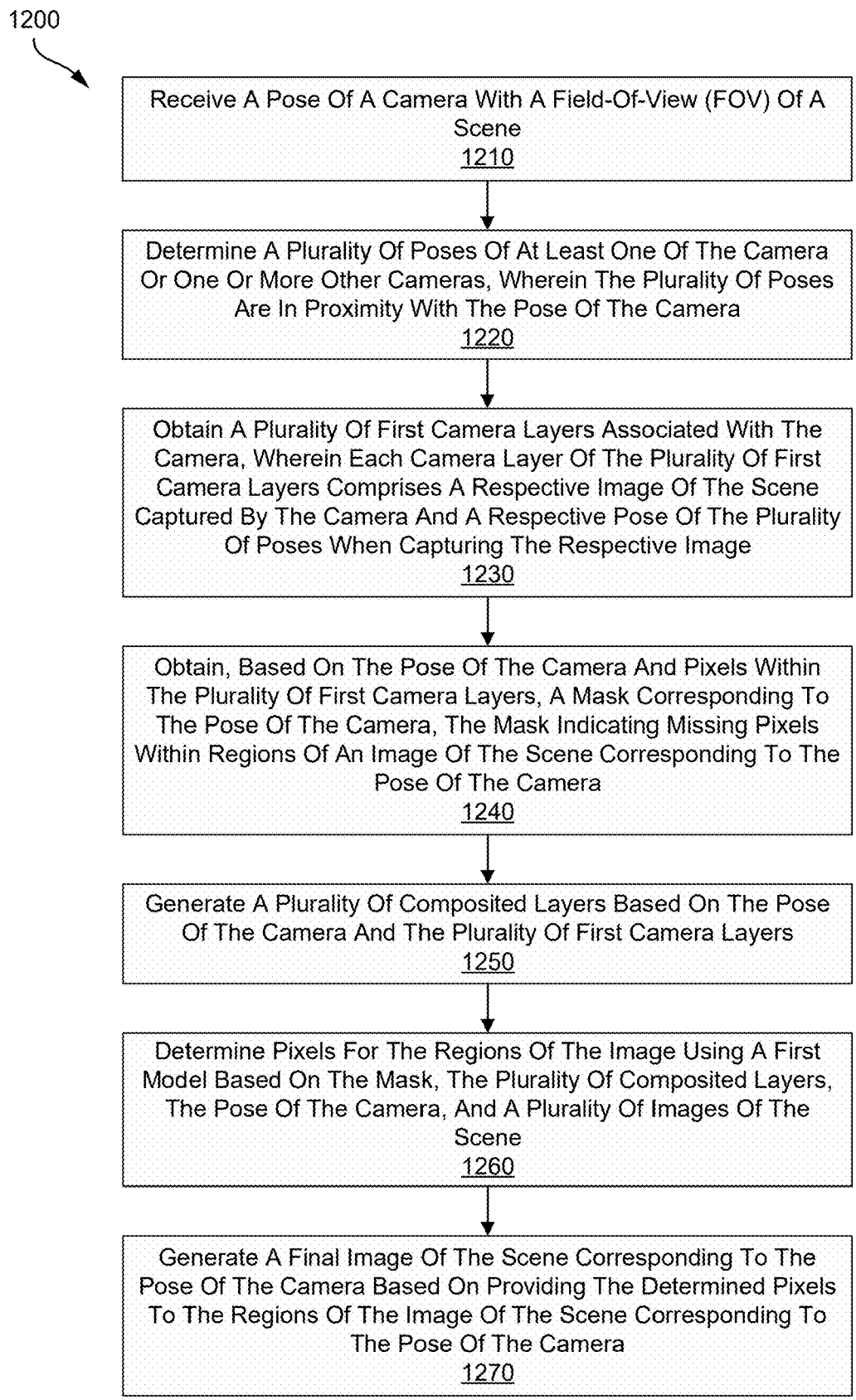
FIG. 12 is a flow chart illustrating an example of a process for image processing, in accordance with some aspects of the present disclosure.

FIG. 12 is a flow chart illustrating an example of a process 1200 for novel view synthesis (e.g., real-time or near real-time novel view synthesis) from images and/or video (e.g., RGBD images or video frames) using model-based inpainting. The process 1200 can be performed by a computing device (e.g., computing system 1300 of FIG. 13 configured to implement process 600 of FIG. 6, the process 700 of FIG. 7, the process illustrated by the example 800 of FIG. 8, the system 900 of FIG. 9, etc.) or by a component or system (e.g., a chipset, one or more processors such as one or more central processing units (CPUs), digital signal processors (DSPs), graphics processing units (GPUs), any combination thereof, and/or other type of processor(s), or other component or system) of the computing device. In some aspects, the computing device is an XR device, such as an HMD (e.g., configured to render VR, AR, and/or MR content), AR and/or MR glasses, etc. The operations of the process 1200 may be implemented as software components that are executed and run on one or more processors (e.g., processor 1310 of FIG. 13 or other processor(s)). Further, the transmission and reception of signals by the computing device in the process 1200 may be enabled, for example, by one or more antennas and/or one or more transceivers (e.g., wireless transceiver(s)).

At block 1210, the computing device (or component thereof) can receive a pose of a camera with a field-of-view (FOV) of a scene. In some cases, the computing device (or component thereof) can obtain the pose of the camera from a pose tracker (e.g., pose tracker 945 of FIG. 9). In some aspects, the computing device includes the camera (e.g., the camera is part of or is a component of the computing device).

At block 1220, the computing device (or component thereof) can determine a plurality of poses of at least one of the camera or one or more other cameras. The plurality of poses are in proximity with the pose of the camera. For instance, an example of the plurality of poses includes the poses of the K nearest camera poses 950 illustrated in FIG. 9. For instance, as described, an FOV associated with each pose of the plurality of poses (e.g., of the K nearest camera poses 950) intersects the FOV associated with the pose of the camera.

At block 1230, the computing device (or component thereof) can obtain a plurality of first camera layers associated with the camera. Each camera layer of the plurality of first camera layers includes a respective image of the scene captured by the camera and a respective pose of the plurality of poses when capturing the respective image. In some cases, the plurality of first camera layers are encoded into a bitstream (e.g., by encoder 930 of FIG. 9) and stored on a server (e.g., server 904). In some aspects, the computing device (or component thereof) can generate the plurality of first camera layers using a depth-based reprojection of a plurality of initial camera layers (e.g., the plurality of layers 650 of FIG. 6, the camera layers 905 of FIG. 9, etc.). For instance, each initial camera layer of the plurality of initial camera layers includes a respective image of the scene captured by the camera and a respective pose of the camera when capturing the image.

At block 1240, the computing device (or component thereof) can obtain, based on the pose of the camera and pixels within the plurality of first camera layers, a mask corresponding to the pose of the camera. The mask indicates missing pixels within regions of an image of the scene corresponding to the pose of the camera.

At block 1250, the computing device (or component thereof) can generate a plurality of composited layers based on the pose of the camera and the plurality of first camera layers. In some aspects, the computing device (or component thereof, such as the compositor 620 of FIG. 6) can generate the plurality of composited layers by compositing the plurality of first camera layers based on the pose of the camera.

At block 1260, the computing device (or component thereof) can determine pixels for the regions of the image using a first model based on the mask, the plurality of composited layers, the pose of the camera, and a plurality of images of the scene. In some aspects, the first model is a diffusion model, a vision-based transformer model, a generative adversarial network (GAN), or other type of model (e.g., neural network model).

At block 1270, the computing device (or component thereof) can generate a final image (e.g., the final frame 695 of FIG. 6, the final frame 970 of FIG. 9, etc.) of the scene corresponding to the pose of the camera based on providing the determined pixels to the regions of the image of the scene corresponding to the pose of the camera. In some cases, the computing device (or component thereof) can generate the plurality of images using a second model based on a plurality of second camera layers associated with the camera. For instance, the second model can include a neural radiance fields (NeRF) model, a Gaussian splatting model, or other model (e.g., a neural network model). In some cases, the second model is trained on the computing device and/or on a server. In some examples, the plurality of first camera layers, the plurality of initial camera layers (e.g., the plurality of layers 650 of FIG. 6, the camera layers 905 of FIG. 9, etc.), and the final image have a first resolution, and the plurality of images and the plurality of second camera layers have a second resolution, where the first resolution is a higher resolution than the second resolution. For instance, referring to FIG. 9 as an illustrative example, the model 940 can generate (e.g., after the model 940 has been trained) a plurality of images with a low resolution based on a display pose ($P_d$) of the camera. The model 960 can generate a final image frame 970 (e.g., with a high resolution) of the scene corresponding to the display pose ($P_d$) of the camera based on providing (e.g., inpainting) pixels to the regions of the image (e.g., a depth-based reprojected image) of the scene corresponding to the display pose ($P_d$) of the camera.

In some cases, the computing device configured to perform the process 1200 may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device of process 1200 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1200 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
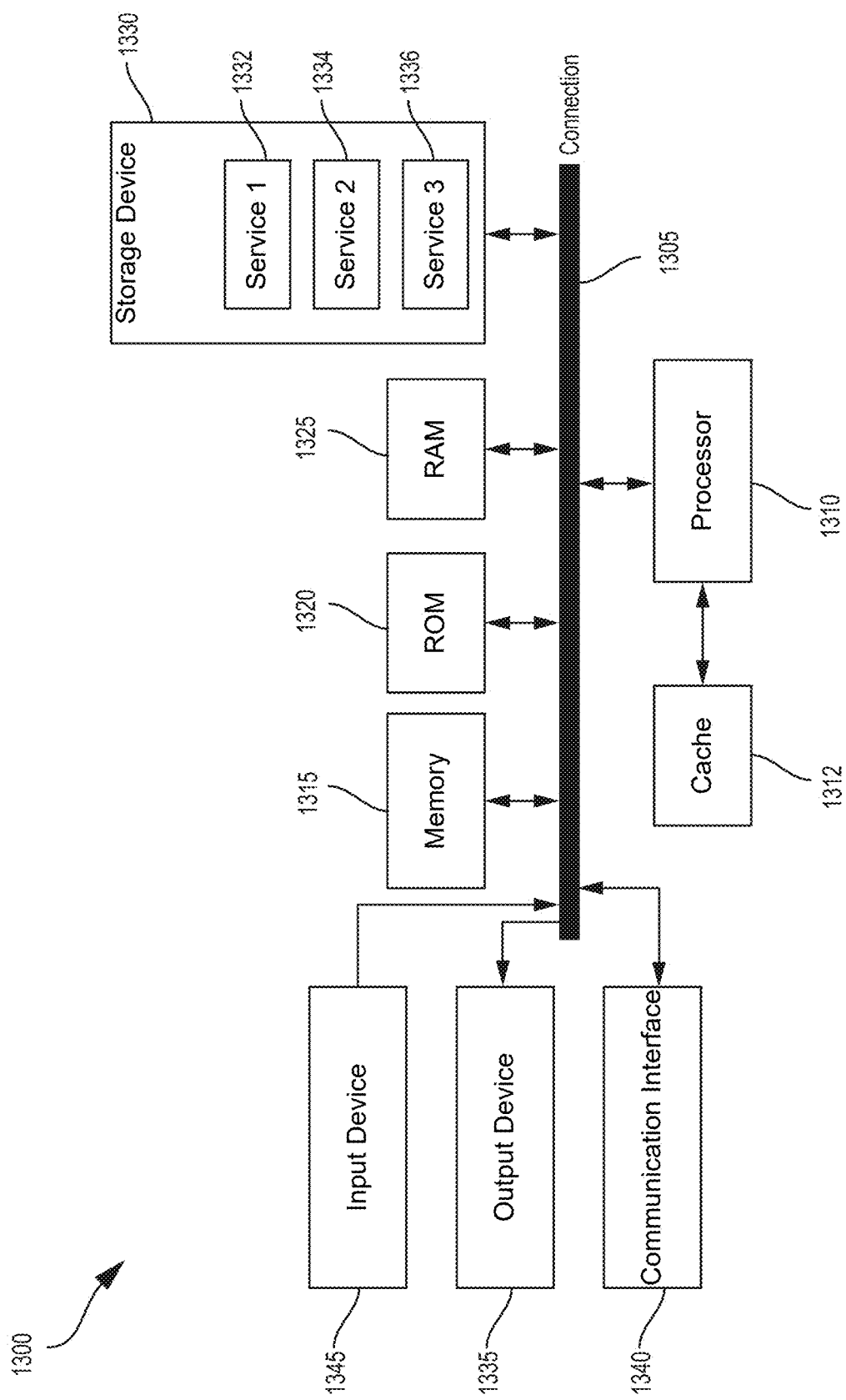
FIG. 13 is a block diagram illustrating an example computing system, in accordance with some aspects of the present disclosure.

FIG. 13 is a block diagram illustrating an example of a computing system 1300, which may be employed for interoperable avatars. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some aspects, computing system 1300 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1300 includes at least one processing unit (CPU or processor) 1310 and connection 1305 that communicatively couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300.

Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1340 may also include one or more range sensors (e.g., LIDAR sensors, laser range finders, RF radars, ultrasonic sensors, and infrared (IR) sensors) configured to collect data and provide measurements to processor 1310, whereby processor 1310 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some aspects, a hardware service that performs a particular function can include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per sc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for image processing, the apparatus comprising: at least one memory; and at least one processor coupled to the at least one memory and configured to: receive a pose of a camera with a field-of-view (FOV) of a scene; determine a plurality of poses of at least one of the camera or one or more other cameras, wherein the plurality of poses are in proximity with the pose of the camera; obtain a plurality of first camera layers associated with the camera, wherein each camera layer of the plurality of first camera layers comprises a respective image of the scene captured by the camera and a respective pose of the plurality of poses when capturing the respective image; obtain, based on the pose of the camera and pixels within the plurality of first camera layers, a mask corresponding to the pose of the camera, the mask indicating missing pixels within regions of an image of the scene corresponding to the pose of the camera; generate a plurality of composited layers based on the pose of the camera and the plurality of first camera layers; determine pixels for the regions of the image using a first model based on the mask, the plurality of composited layers, the pose of the camera, and a plurality of images of the scene; and generate a final image of the scene corresponding to the pose of the camera based on providing the determined pixels to the regions of the image of the scene corresponding to the pose of the camera.

Aspect 2. The apparatus of Aspect 1, wherein the at least one processor is configured to generate the plurality of first camera layers using a depth-based reprojection of a plurality of initial camera layers.

Aspect 3. The apparatus of Aspect 2, wherein each initial camera layer of the plurality of initial camera layers comprises a respective image of the scene captured by the camera and a respective pose of the camera when capturing the image.

Aspect 4. The apparatus of any of Aspects 1 to 3, wherein the at least one processor is configured to generate the plurality of images using a second model based on a plurality of second camera layers associated with the camera.

Aspect 5. The apparatus of Aspect 4, wherein the plurality of first camera layers, the plurality of initial camera layers, and the final image have a first resolution, wherein the plurality of images and the plurality of second camera layers have a second resolution, and wherein first resolution is a higher resolution than the second resolution.

Aspect 6. The apparatus of any of Aspects 4 or 5, wherein the second model is one of a neural radiance fields (NeRF) model or a Gaussian splatting model.

Aspect 7. The apparatus of any of Aspects 4 to 6, wherein the second model is trained on one of the apparatus or a server.

Aspect 8. The apparatus of any of Aspects 1 to 7, wherein the at least one processor is configured to obtain, from a pose tracker, the pose of the camera.

Aspect 9. The apparatus of any of Aspects 1 to 8, wherein the first model is one of a diffusion model, a vision-based transformer model, or a generative adversarial network (GAN).

Aspect 10. The apparatus of any of Aspects 1 to 9, wherein the plurality of first camera layers are encoded into a bitstream and stored on a server.

Aspect 11. The apparatus of any of Aspects 1 to 10, wherein an FOV associated with each pose of the plurality of poses intersects the FOV associated with the pose of the camera.

Aspect 12. The apparatus of any of Aspects 1 to 11, further comprising the camera.

Aspect 13. The apparatus of Aspect 12, wherein the apparatus is a head mounted device (HMD).

Aspect 14. The apparatus of any of Aspects 1 to 13, wherein the plurality of composited layers are generated by compositing the plurality of first camera layers based on the pose of the camera.

Aspect 15. A method of image processing, the method comprising: receiving a pose of a camera with a field-of-view (FOV) of a scene; determining a plurality of poses of at least one of the camera or one or more other cameras, wherein the plurality of poses are in proximity with the pose of the camera; obtaining a plurality of first camera layers associated with the camera, wherein each camera layer of the plurality of first camera layers comprises a respective image of the scene captured by the camera and a respective pose of the plurality of poses when capturing the respective image; obtaining, based on the pose of the camera and pixels within the plurality of first camera layers, a mask corresponding to the pose of the camera, the mask indicating missing pixels within regions of an image of the scene corresponding to the pose of the camera; generating a plurality of composited layers based on the pose of the camera and the plurality of first camera layers; determining pixels for the regions of the image using a first model based on the mask, the plurality of composited layers, the pose of the camera, and a plurality of images of the scene; and generating a final image of the scene corresponding to the pose of the camera based on providing the determined pixels to the regions of the image of the scene corresponding to the pose of the camera.

Aspect 16. The method of Aspect 15, wherein the plurality of first camera layers is generated by a depth-based reprojection of a plurality of initial camera layers.

Aspect 17. The method of Aspect 16, wherein each initial camera layer of the plurality of initial camera layers comprises a respective image of the scene captured by the camera and a respective pose of the camera when capturing the image.

Aspect 18. The method of any of Aspects 15 to 17, wherein the plurality of images are generated by a second model based on a plurality of second camera layers associated with the camera.

Aspect 19. The method of Aspect 18, wherein the plurality of first camera layers, the plurality of initial camera layers, and the final image have a first resolution, wherein the plurality of images and the plurality of second camera layers have a second resolution, and wherein first resolution is a higher resolution than the second resolution.

Aspect 20. The method of Aspect 19, wherein the second model is one of a neural radiance fields (NeRF) model or a Gaussian splatting model.

Aspect 21. The method of any of Aspects 19 or 20, wherein the second model is trained on one of a device associated with the camera or a server.

Aspect 22. The method of any of Aspects 15 to 21, further comprising obtaining, by a pose tracker, the pose of the camera.

Aspect 23. The method of any of Aspects 15 to 22, wherein the first model is one of a diffusion model, a vision-based transformer model, or a generative adversarial network (GAN).

Aspect 24. The method of any of Aspects 15 to 23, wherein the plurality of first camera layers are encoded into a bitstream and stored on a server.

Aspect 25. The method of any of Aspects 15 to 24, wherein an FOV associated with each pose of the plurality of poses intersects the FOV associated with the pose of the camera.

Aspect 26. The method of any of Aspects 15 to 25, wherein the camera is associated with a device.

Aspect 27. The method of Aspect 26, wherein the device is a head mounted device (HMD).

Aspect 28. The method of any of Aspects 15 to 27, wherein the plurality of composited layers are generated by compositing the plurality of first camera layers based on the pose of the camera.

Aspect 29. A non-transitory computer-readable medium having stored thereon instructions that, when executed by at least one processor, cause the at least one processor to perform operations according to any of Aspects 15 to 28.

Aspect 30. An apparatus for image processing, the apparatus including one or more means for performing operations according to any of Aspects 15 to 28.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for image processing, the apparatus comprising:
   at least one memory; and
   at least one processor coupled to the at least one memory and configured to:
      receive a pose of a camera with a field-of-view (FOV) of a scene;
      determine a plurality of poses of at least one of the camera or one or more other cameras;
      generate a plurality of first camera layers associated with the camera using a depth-based reprojection of a plurality of initial camera layers, wherein each camera layer of the plurality of first camera layers comprises a respective image of the scene captured by the camera and a respective pose of the plurality of poses when capturing the respective image;
      obtain, based on the pose of the camera and pixels within the plurality of first camera layers, a mask corresponding to the pose of the camera, the mask indicating missing pixels within regions of an image of the scene corresponding to the pose of the camera;
      generate a plurality of composited layers based on the pose of the camera and the plurality of first camera layers;
      determine pixels for the regions of the image using a first model based on the mask, the plurality of composited layers, the pose of the camera, and a plurality of images of the scene, wherein the plurality of images are generated using a second model based on a plurality of second camera layers associated with the camera; and
      generate a final image of the scene corresponding to the pose of the camera based on providing the determined pixels to the regions of the image of the scene corresponding to the pose of the camera, wherein the plurality of first camera layers, the plurality of initial camera layers, and the final image have a first resolution, wherein the plurality of images and the plurality of second camera layers have a second resolution, and wherein the first resolution is a higher resolution than the second resolution.

2. The apparatus of claim 1, wherein each initial camera layer of the plurality of initial camera layers comprises a respective image of the scene captured by the camera and a respective pose of the camera when capturing the image.

3. The apparatus of claim 1, wherein the second model is one of a neural radiance fields (NeRF) model or a Gaussian splatting model.

4. The apparatus of claim 1, wherein the second model is trained on one of the apparatus or a server.

5. The apparatus of claim 1, wherein the at least one processor is configured to obtain, from a pose tracker, the pose of the camera.

6. The apparatus of claim 1, wherein the first model is one of a diffusion model, a vision-based transformer model, or a generative adversarial network (GAN).

7. The apparatus of claim 1, wherein the plurality of first camera layers are encoded into a bitstream and stored on a server.

8. The apparatus of claim 1, wherein an FOV associated with each pose of the plurality of poses intersects the FOV associated with the pose of the camera.

9. The apparatus of claim 1, further comprising the camera.

10. The apparatus of claim 9, wherein the apparatus is a head mounted device (HMD).

11. The apparatus of claim 1, wherein the plurality of composited layers are generated by compositing the plurality of first camera layers based on the pose of the camera.

12. A method of image processing, the method comprising:
receiving a pose of a camera with a field-of-view (FOV) of a scene;
determining a plurality of poses of at least one of the camera or one or more other cameras;
generating a plurality of first camera layers associated with the camera using a depth-based reprojection of a plurality of initial camera layers, wherein each camera layer of the plurality of first camera layers comprises a respective image of the scene captured by the camera and a respective pose of the plurality of poses when capturing the respective image;
obtaining, based on the pose of the camera and pixels within the plurality of first camera layers, a mask corresponding to the pose of the camera, the mask indicating missing pixels within regions of an image of the scene corresponding to the pose of the camera;
generating a plurality of composited layers based on the pose of the camera and the plurality of first camera layers;
determining pixels for the regions of the image using a first model based on the mask, the plurality of composited layers, the pose of the camera, and a plurality of images of the scene, wherein the plurality of images are generated using a second model based on a plurality of second camera layers associated with the camera; and
generating a final image of the scene corresponding to the pose of the camera based on providing the determined pixels to the regions of the image of the scene corresponding to the pose of the camera, wherein the plurality of first camera layers, the plurality of initial camera layers, and the final image have a first resolution, wherein the plurality of images and the plurality of second camera layers have a second resolution, and wherein the first resolution is a higher resolution than the second resolution.

13. The method of claim 12, wherein each initial camera layer of the plurality of initial camera layers comprises a respective image of the scene captured by the camera and a respective pose of the camera when capturing the image.

14. The method of claim 12, wherein the plurality of composited layers are generated by compositing the plurality of first camera layers based on the pose of the camera.

15. The method of claim 12, wherein the second model is one of a neural radiance fields (NeRF) model or a Gaussian splatting model.

16. The method of claim 12, wherein the second model is trained on one of a device performing the method or a server.

17. The method of claim 12, further comprising obtaining, from a pose tracker, the pose of the camera.

18. The method of claim 12, wherein the first model is one of a diffusion model, a vision-based transformer model, or a generative adversarial network (GAN).

19. The method of claim 12, wherein the plurality of first camera layers are encoded into a bitstream and stored on a server.

20. The method of claim 12, wherein an FOV associated with each pose of the plurality of poses intersects the FOV associated with the pose of the camera.

* * * * *